United States Patent
Furth et al.

(10) Patent No.: US 9,958,891 B1
(45) Date of Patent: May 1, 2018

(54) HIGH-VOLTAGE MICRO-AMPERE CURRENT REGULATOR

(71) Applicant: Arrowhead Center, Inc., Las Cruces, NM (US)

(72) Inventors: Paul M. Furth, Las Cruces, NM (US); Anurag Veerabathini, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 1 day.

(21) Appl. No.: 15/166,070

(22) Filed: May 26, 2016

Related U.S. Application Data

(60) Provisional application No. 62/166,487, filed on May 26, 2015.

(51) Int. Cl.
*H02M 3/155* (2006.01)
*G05F 1/575* (2006.01)

(52) U.S. Cl.
CPC ............ *G05F 1/575* (2013.01); *H02M 3/155* (2013.01)

(58) Field of Classification Search
None
See application file for complete search history.

(56) References Cited

U.S. PATENT DOCUMENTS

| | | |
|---|---|---|
| 4,116,238 A | 9/1978 | Pettijohn |
| 4,719,405 A | 1/1988 | Boucher |
| 5,017,876 A | 5/1991 | Wright et al. |
| 5,404,053 A * | 4/1995 | Poma .............. H03F 1/523 327/108 |
| 5,793,596 A * | 8/1998 | Jordan ............. H02H 3/025 361/18 |
| 5,801,379 A | 9/1998 | Kouznetsov |
| 6,407,382 B1 | 1/2002 | Spangler |
| 6,621,077 B1 | 9/2003 | Guevremont et al. |
| 6,654,264 B2 | 11/2003 | Rose |
| 7,071,465 B2 | 7/2006 | Hill, Jr. et al. |
| 7,326,926 B2 | 2/2008 | Wang |
| 7,414,242 B2 | 8/2008 | Hill, Jr. et al. |
| 7,777,180 B2 | 8/2010 | Hill, Jr. et al. |
| 2002/0159280 A1* | 10/2002 | Zhu .................. H02M 1/34 363/98 |

(Continued)

FOREIGN PATENT DOCUMENTS

| | | |
|---|---|---|
| CN | 202600451 | 12/2012 |
| CN | 104934286 | 9/2015 |

OTHER PUBLICATIONS

"Using the LT3081 as a Current Source", http://www.linear.com/solutions/4480, 2014.

(Continued)

*Primary Examiner* — Jeffrey Gblende
(74) *Attorney, Agent, or Firm* — Justin R. Jackson; Deborah A. Peacock; Peacock Law P.C.

(57) ABSTRACT

A high-voltage micro-ampere current regulator which can provide stable current regulation to a corona discharge without requiring a portion of that corona discharge to be sampled. The current regulator can optionally include a first feed-back circuit which provides rapidly-adapting current regulation, and an optional second feedback circuit which provides slowly-adapting current regulation to avoid changes in corona discharge due to oxidation of the corona emitter.

17 Claims, 33 Drawing Sheets

(56) References Cited

U.S. PATENT DOCUMENTS

| | | | | |
|---|---|---|---|---|
| 2005/0110477 A1* | 5/2005 | Mauthe | ............ | G05F 1/465 |
| | | | | 323/316 |
| 2006/0007714 A1* | 1/2006 | Hua | ............ | H02M 1/32 |
| | | | | 363/24 |
| 2008/0061752 A1* | 3/2008 | Heath | ............ | G05F 1/5735 |
| | | | | 323/277 |
| 2008/0204958 A1* | 8/2008 | Shearon | ............ | H02H 3/18 |
| | | | | 361/93.9 |
| 2015/0303044 A1 | 10/2015 | Kaye et al. | | |
| 2016/0254662 A1* | 9/2016 | Dawley | ............ | H02H 9/02 |
| | | | | 361/93.1 |

OTHER PUBLICATIONS

Belov, et al., "Initial Implementation of External Accumulation Liquid Chromatography/Electrospray Ionization Fourier Transform Ion Cyclotron Resonance with Automated Gain Control", Rapid Coomun. Mass Spectrom www.interscience.wiley.com, Jan. 20, 2003.

Harrison, "Creating Precision Current Regulators with OP AMPS", Current Sources & Voltage References Burlington: Elsevier, 2005, 311-317.

Harrison, "Using the Enhancement-Mode MOSFET as a Current Source", Current Sources & Voltage References Burlington: Elsevier, 2005, 218-230.

Hong, et al., "Temporal and Spatial Current Stability of Smart Field Emission Arrays", IEEE Transactions on Electron Devices, vol. 52, No. 10, Oct. 2005.

Ridgeway, "Advances in High Field Asymmetric Ion Mobility Spectrometry (FAIMS) Analyzers and FAIMS-Mass Spectrometry Interfaces", Dissertation at University of North Carolina at Chapel Hill Department of Chemistry, 2010.

Yang, et al., "Field Emission From a MOSFET-Controlled ZnO-Nanowire Cold Cathode", IEEE Transactions on Electron Devices, vol. 59, No. 12, Dec. 2012.

* cited by examiner

Fig. 30A
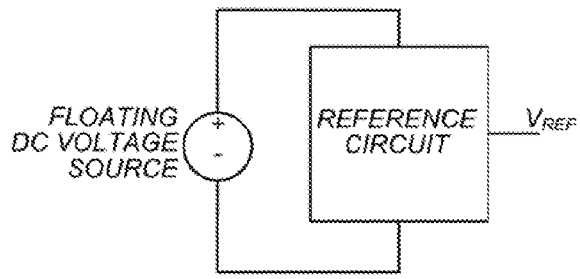
Fig. 30B
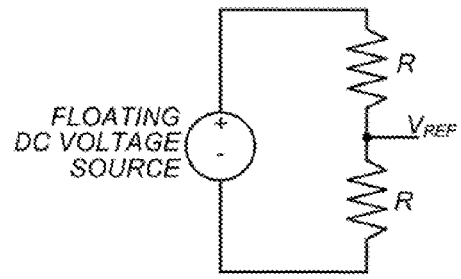
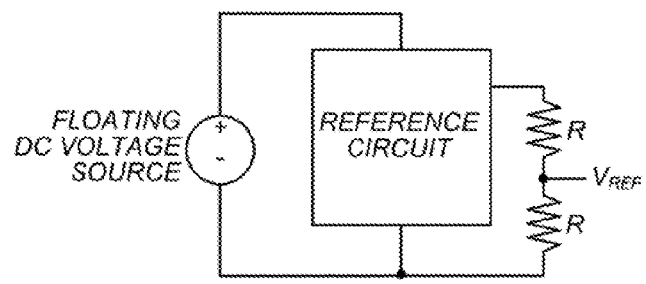
Fig. 30C

HIGH-VOLTAGE MICRO-AMPERE CURRENT REGULATOR

CROSS-REFERENCE TO RELATED APPLICATIONS

This application claims priority to and the benefit of the filing of U.S. Provisional Patent Application Ser. No. 62/166,487, entitled "High-Voltage Micro-Ampere Current Regulator", filed on May 26, 2015, and the specification thereof is incorporated herein by reference.

STATEMENT REGARDING FEDERALLY SPONSORED RESEARCH OR DEVELOPMENT

This invention was made with government support under Contract No. NNX13AB19A awarded by New Mexico Space Grant and NASA EPSCoR. The government may have certain rights in the invention.

BACKGROUND OF THE INVENTION

Field of the Invention (Technical Field)

Embodiments of the present invention relate to a high voltage current regulator.

Mass spectrometers (MS), Ion Mobility Spectrometers (IMS) and their variant Differential Ion Mobility Spectrometers (DMS) are analytical instruments that analyze toxins, air samples, proteins, lipids, metals, metabolites, and chemicals formulations. Mass Spectrometers operate in a vacuum chamber, separating ions based on their mass to charge ratio. IMS and DMS operate at ambient pressures and separate ions based on their electrical mobility. MS, IMS and DMS instruments are used in applications such as chemical weapons detection, explosives detection, drug detection, air quality monitoring, and chemical and biological material analysis. Other instruments, such as an electronic nose (e-nose), have been used in recent years to determine the quality of air and food through olfaction by discriminating between various biological entities such as bacteria and fungi. But, the resolution of such instruments is very low compared to MS, IMS and DMS.

Ion Mobility Spectrometry has the ability to separate ions based on their electrical mobilities in a constant electric field. IMS is a more inexpensive and convenient method compared to other existing detection mechanisms as it allows real-time monitoring in ambient air conditions. Referring to FIG. 1, ion mixtures are injected into a drift region. The high electric field moves ions toward the electrode ion detector. In general, smaller, lighter ions have higher mobility and therefore reach the detector more quickly, whereas larger ions arrive at a later time. The location of the peak (typically measured in milliseconds) and the area of the peak helps to identify a specific ion species and its concentration, respectively.

There exist a wide variety of IMS instruments in the market. Each instrument has three components: an ionization source, a drift region, and a detector. Corona Discharge (CD), one type of ionization source, has many commercial and industrial applications. It is characterized as a high voltage, low current, and low intensity photoemission ionization source. The ion detection sensitivity of an IMS instrument is enhanced with higher ionization efficiency and is adversely affected by variations in the ion source intensity over time.

Unlike an unregulated corona discharge ionization source that is attached directly to a constant voltage source (see FIG. 2A), a corona with current regulation (see FIG. 2B) can deliver a constant flow of ions resulting in more robust and reliable IMS measurements.

Alternative technologies exist to regulate the ion current. Some known systems, such as that described in U.S. Pat. No. 6,407,382, teach to use a secondary electrode to sample the ion current produced by the corona source, as illustrated (see FIG. 3A of the instant application). The sampled ion current is converted to a voltage using a trans-impedance amplifier. Through negative feedback, the value of the high-voltage supplied to the corona is continuously varied in such a way as to stabilize the ion current. This method relies on a mechanical electrode whose properties are affected by various environmental factors such as moisture, temperature and oxidation. Because the secondary electrode must receive some of the corona discharge in order to function, those types of current regulation schemes necessarily waste a portion of the produced ion stream.

U.S. Pat. No. 4,116,238 teaches to use a grounded resistor to sense the current through a load, which is body tissue. In that invention, the current is adjusted by adjusting the output of the high-voltage power supply. However, the load is not grounded, because it lies between the high-voltage power supply and sense resistor.

There is thus a present need for a high voltage current regulator which provides a higher-bandwidth feedback loop and higher ion efficiency when driving a grounded load.

BRIEF SUMMARY OF EMBODIMENTS OF THE PRESENT INVENTION

An embodiment of the present invention relates to a high-voltage current regulator having a first feedback loop which itself has a first high-voltage DC-to-DC isolation converter with a first terminal coupled to a power supply and a second terminal coupled to a reference voltage, a potentiometer having a first terminal coupled to the reference voltage and a second terminal coupled to an input of a first operational amplifier; the first operational amplifier having a second input terminal coupled to a first terminal of a resistor, and a high-voltage enhancement-mode NMOS transistor having a gate terminal coupled to an output terminal of the first operational amplifier, a source terminal connected to a high-voltage source; and a drain coupled to the first terminal of the resistor.

In one embodiment, the first operational amplifier can be a CMOS rail-to-rail operational amplifier. The resistor can be a precision resistor. The precision resistor can be a low temperature coefficient 25 ppm/degree centigrade resistor. In one embodiment, the second terminal of the resistor can be coupled to a load such that the load is in series with the resistor.

The high-voltage current regulator can also include a second feedback loop, which itself includes a second operational amplifier having a first input terminal coupled to a reference voltage, a second input terminal coupled to a sensed output voltage, and an output terminal coupled to a reference input terminal of a high-efficiency DC-DC converter, the high-efficiency DC-DC converter can have an output terminal coupled to an input terminal of a second DC-DC isolation converter and an output of the second DC-DC isolation converter can form the high-voltage source, and a resistor divider circuit having a first terminal coupled to the output of the second DC-DC isolation converter and a second terminal coupled to the second terminal of the resistor.

Optionally, the resistor divider circuit can include a divided voltage connection terminal which provides the sensed output voltage that is coupled to the second input terminal of the second operational amplifier.

An embodiment of the present invention also relates to a high-voltage current regulator feedback loop having an operational amplifier with a first input terminal coupled to a reference voltage, a second input terminal coupled to a sensed output voltage, and an output terminal coupled to a reference input terminal of a high-efficiency DC-DC converter, and the high-efficiency DC-DC converter can have an output terminal coupled to an input terminal of a DC-DC isolation converter and an output of the DC-DC isolation converter can form a high-voltage supply output. The sensed output voltage can include a divided portion of a voltage drop across a high-voltage enhancement-mode NMOS transistor in series with a precision resistor.

An embodiment of the present invention also relates to a method for regulating high-voltage current provided to a load which includes providing a reference voltage to a first input of an operational amplifier, providing an output of a drain of an NMOS transistor to a second input of the operational amplifier, adjusting the gate of the NMOS transistor with the output of the operational amplifier, and driving the load through a precision resistor. Optionally, the regulation of current can be made adjustable by providing an adjustable reference voltage to the first input of the operational amplifier. In one embodiment, the reference voltage that is provided to the first input of the operational amplifier can be obtained from the wiper of a potentiometer which is connected across a precision voltage reference. The precision voltage reference can be powered by a DC-DC isolation converter.

An embodiment of the present invention also relates to a method for regulating high voltage current provided to a load. The method can include providing a reference voltage to a first input of an operational amplifier, providing a sensed voltage to a reference input of a high-efficiency DC-DC converter, coupling an output of the high-efficiency DC-DC converter to an input of a DC-DC isolation converter, connecting a first end of a voltage divider circuit to an output of the DC-DC isolation converter and a second end of the voltage divider to a load, and sending a divided voltage from the voltage divider to a second input of the operational amplifier. The reference voltage that is provided to the first input of the operational amplifier can be adjustable, which adjustable voltage can optionally be obtained from a wiper of a potentiometer that forms an adjustable voltage divider circuit.

An embodiment of the present invention also relates to a high-voltage current regulator having a first feedback loop having a floating DC voltage source with high-voltage isolation having the positive and negative terminals coupled to the positive and negative power terminals of a first operational amplifier; a first reference voltage coupled to the first input terminal of the first operational amplifier; the first operational amplifier having a second input terminal coupled to a first terminal of a resistor; an NMOS transistor having a gate terminal coupled to the output terminal of the first operational amplifier, a drain terminal coupled to the positive terminal of a high-voltage source; and a source terminal coupled to the first terminal of the resistor; the resistor having a second terminal coupled to the second terminal of the floating DC voltage source; the resistor having a second terminal also coupled to the first terminal of a load such that the load is in series with the resistor; and the load having second terminal coupled to the negative terminal of a high-voltage source. In one embodiment, the NMOS transistor can be replaced with a PMOS transistor, the PMOS transistor having the drain terminal coupled to the first terminal of the load, the resistor having a second terminal coupled to the first terminal of the floating DC voltage source, and the resistor having a second terminal also coupled to the positive terminal of the high-voltage source. In one embodiment, the resistor can have a second terminal coupled to the negative terminal of the high-voltage source, the NMOS transistor can have a drain terminal coupled to the first terminal of a load, and the load can have a second terminal coupled to the positive terminal of a high-voltage source. Optionally, the NMOS transistor can be replaced with a PMOS transistor, the PMOS transistor can have its drain terminal coupled to the negative terminal of the high-voltage source, the resistor can have a second terminal coupled to the first terminal of the floating DC voltage source, and the resistor can have a second terminal coupled to the first terminal of a load.

Optionally, the first reference voltage can be the output of a reference circuit powered by the floating DC voltage source, or a divided voltage of the floating DC voltage source, or a combination of a reference circuit and a divided voltage. In one embodiment, the current regulator can also include a second feedback loop having a second operational amplifier having positive and negative power supply terminals coupled to the positive and negative terminals of the floating DC voltage source, a first input terminal coupled to a second reference voltage, a second input terminal coupled to a sense circuit output voltage across the current regulator, and an output terminal coupled to a control input terminal of a DC-DC converter; the sense circuit can have a first input voltage coupled to the drain of the NMOS transistor and a second input terminal coupled to the negative terminal of the floating DC voltage source; and the DC-DC converter can have positive and negative input terminals connected to the positive and negative terminals of the floating DC voltage source, a positive output terminal of the DC-DC converter forming the high-voltage source, and a negative output terminal coupled to the second terminal of the load. Optionally, the NMOS transistor can be replaced with a PMOS transistor, the PMOS transistor can have the drain terminal coupled to the first terminal of the load, the resistor can have a second terminal coupled to the first terminal of the floating DC voltage source, and the resistor can have a second terminal also coupled to the positive output terminal of the DC-DC converter. In another embodiment, the resistor can have a second terminal coupled to the negative terminal of a high-voltage source, the NMOS transistor can have the drain terminal coupled to the first terminal of a load, and the load can have a second terminal connected to the positive terminal of a high-voltage source. Optionally, the NMOS transistor can be replaced with a PMOS transistor, the PMOS transistor can have a drain terminal coupled to the negative terminal of the high-voltage source, the resistor can have a second terminal coupled to the positive terminal of the floating DC voltage source, and the resistor can have a second terminal also coupled to the first terminal of the load.

An embodiment of the present invention also relates to a high-voltage current regulator having a floating DC voltage source with high-voltage isolation having the positive and negative terminals coupled to the positive and negative power terminals of an operational amplifier; an operational amplifier having a first input terminal coupled to a reference voltage, a second input terminal coupled to the first terminal of a resistor, and an output terminal coupled to a control input terminal of a DC-DC converter; the resistor having a first terminal coupled to the positive terminal of a high-voltage source; the resistor having a second terminal coupled to the negative terminal of the floating DC voltage source; the resistor having a second terminal also coupled to the first terminal of a load; a DC-DC converter having positive and negative input terminals connected to the positive and negative terminals of the floating DC voltage source, positive and negative output terminals of the DC-DC converter forming the positive and negative terminals of a high-voltage source; and the load having a second terminal coupled to the negative terminal of a high-voltage source. Optionally, the DC-DC converter can have a negative output terminal coupled to the resistor second terminal; the resistor having a first terminal coupled to the positive terminal of said floating DC voltage source; the operational amplifier having a first input terminal coupled to the resistor second terminal and a second input terminal coupled to a reference voltage; and the load having a second terminal coupled to the positive output terminal of the DC-DC converter. In one embodiment, reference voltage can be the output of a reference circuit powered by the floating DC voltage source or a divided voltage of the floating DC voltage source or a combination of a reference circuit and a divided voltage.

An embodiment of the present invention also relates to a method for regulating current at the high-voltage terminal of a high-voltage source, the method including providing a floating voltage source to power an operational amplifier; providing a drain of an NMOS transistor to the high-voltage terminal of a high-voltage source; providing a reference voltage to a first input of an operational amplifier; providing a source of an NMOS transistor to a second input of the operational amplifier and the first terminal of a resistor; adjusting the gate voltage of the NMOS transistor with the output of the operational amplifier; and driving the load in series with and coupled to the second terminal of a resistor. In one embodiment, the NMOS transistor can be replaced with a PMOS transistor to regulate the current at the high-voltage terminal of a high-voltage source; a second terminal of the resistor can be coupled to the high-voltage terminal of a high-voltage source; and the load can be driven in series with and connected to the drain terminal of the PMOS transistor.

An embodiment of the present invention also relates to a method for regulating the current provided to a load at the high-voltage terminal of a high-voltage source, the method including providing a floating DC power supply to power an operational amplifier; providing a reference voltage to a first input of the operational amplifier; providing a first terminal of a resistor to a second input of the operational amplifier; providing the floating DC power supply as input terminals of a DC-DC converter; generating a high-voltage source with the output terminals of a DC-DC converter; adjusting the output voltage of the DC-DC converter with the control input voltage with the output of the operational amplifier; and driving the load in series with and coupled to the second terminal of a resistor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 30A, 30B, and 30C are schematic drawings which illustrate circuits that can be used to generate a reference voltage that are used in other embodiments of the present invention;

DETAILED DESCRIPTION OF THE INVENTION

As used throughout this application, the terms "high-voltage" and "high voltage" are intended to mean any voltage of greater than or equal to 500 volts.

Figure 1:
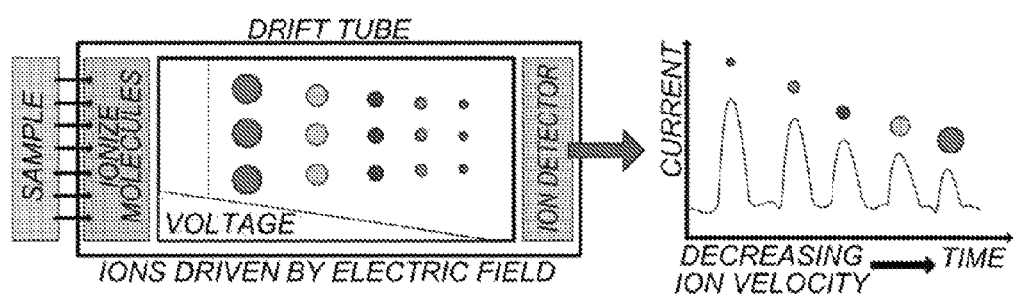
FIG. 1 is a schematic drawing which illustrates basic operation of a ion mobility spectrometer as is known to exist in the prior art.
Figures 2A, 2B:
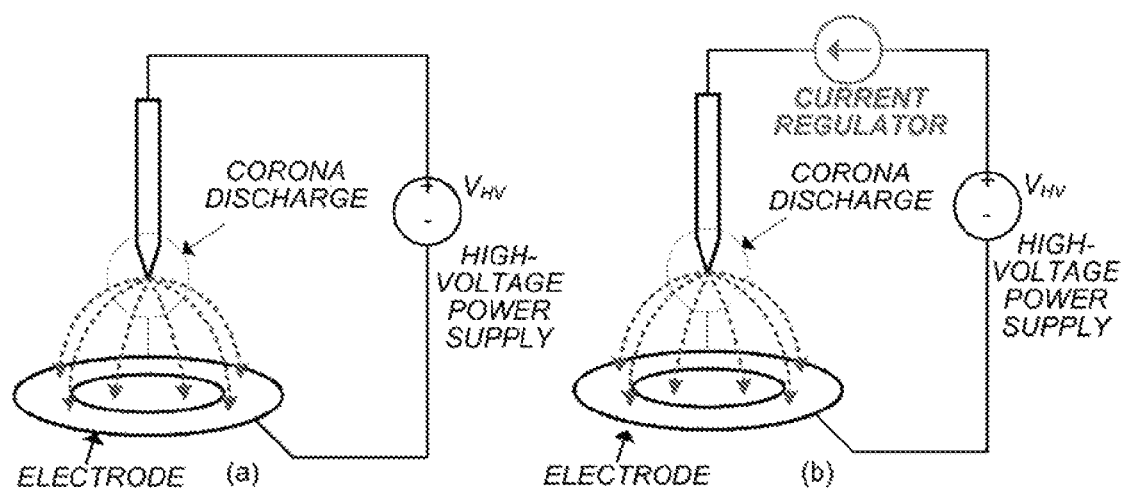
FIG. 2A illustrates a generally known unregulated corona discharge ionization source that is attached directly to a constant voltage source.
FIG. 2B illustrates a corona discharge ionization source having a current regulator attached to the high-voltage terminal of a high-voltage source according to an embodiment of the present invention.
Figures 3A, 3B:
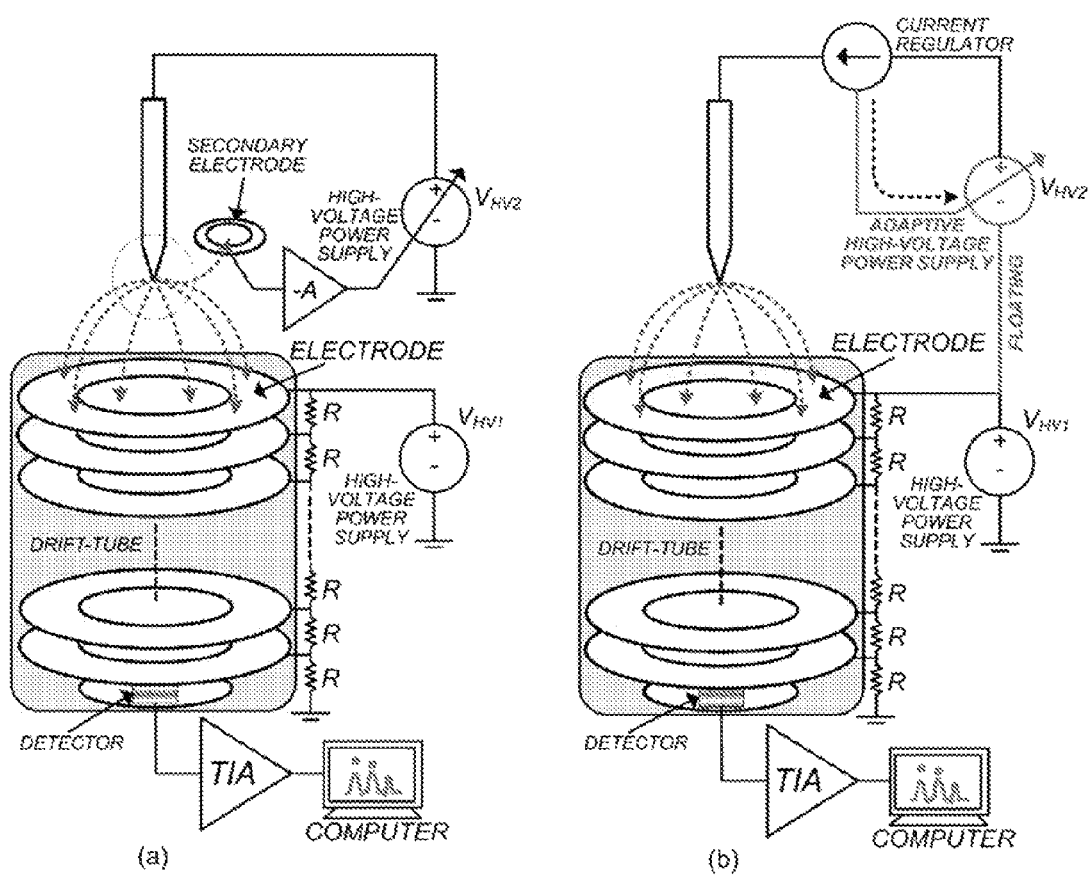
FIGS. 3A and 3B respectively illustrate a corona discharge diagram using a known secondary electrode and a corona discharge diagram using a feedback circuit according to an embodiment of the present invention.

An embodiment of the present invention relates to a negative feedback circuit that senses the voltage across the high-voltage current regulator and slowly varies the high-voltage power supply, as illustrated in FIG. 3B. The slow adaptation in the high-voltage power supply complements the fast feedback mechanism in the current regulator.

Figure 4:
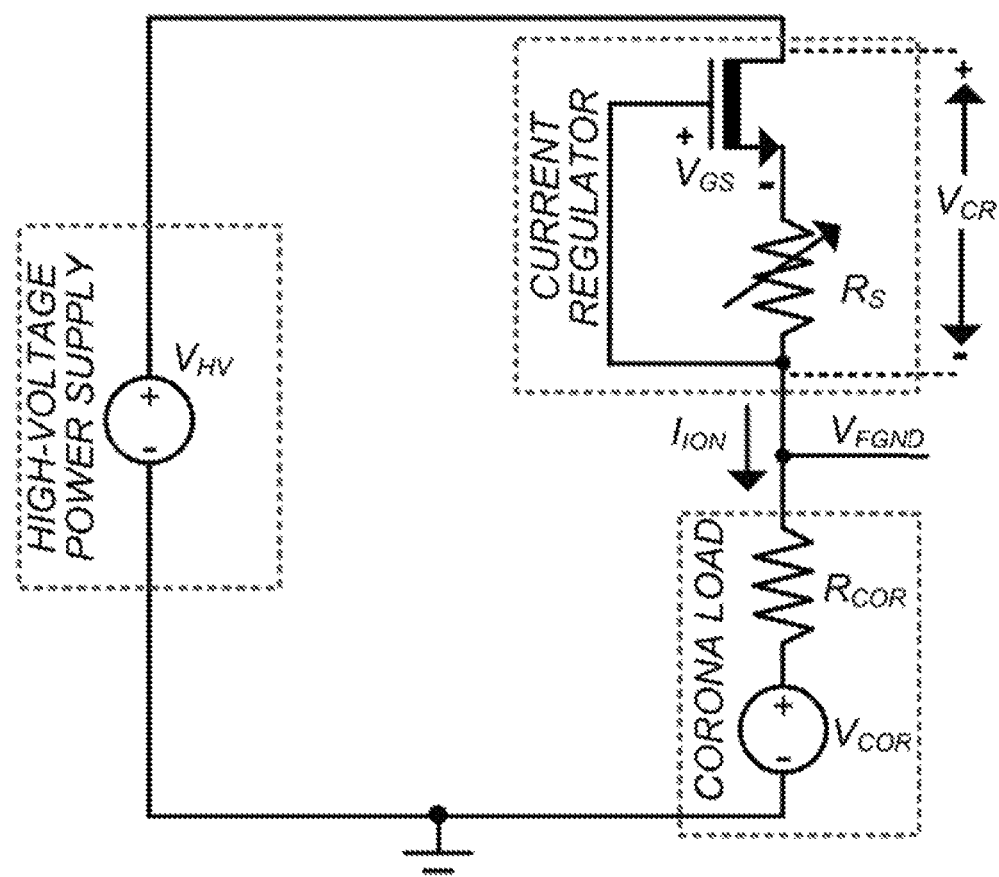
FIG. 4 is a schematic drawing of a depletion-mode current regulator.

A corona ion source produces ion current in response to a relatively-large electric field. A first-order linearized model of a corona consists of a resistor, $R_{COR}$, in series with a voltage source, $V_{COR}$, as illustrated in FIG. 4. A real corona has a non-linear resistance and a voltage drop that varies with time, temperature, moisture and material properties. Initially, tests were conducted using a point-to-plane corona. The material properties in a point-to-plane corona change rapidly compared to a wire-to-plane corona, since the wire-to-plane corona has a much wider surface discharge area than point-to-plane. Thus, generating a stable ion current in a point-to-plane ensures even higher stability in a wire-to-plane configuration.

Depletion-Mode Current Regulator (DMCR): Depletion-mode MOS (metal-oxide-semiconductor) transistors have negative threshold voltages. They are highly conductive for zero gate-to-source ($V_{GS}$) voltage. Thus, with no applied electric field between the source and gate, a channel exists between the drain and source terminals, allowing current to freely flow. In order to reduce the drain-to-source current, a negative $V_{GS}$ reduces the depth of the channel under the gate and thereby increases the channel resistance. Depletion-mode transistors have an advantage of very low forward capacitance from drain-to-body, allowing the transistor to respond very fast and achieve very high bandwidths.

A schematic of the current regulator using a depletion-mode NMOS transistor is illustrated in FIG. 4. A current regulator is placed in series with a high-voltage power supply and corona load.

To determine the ion current, $I_{ION}$, the gate-to-source voltage, $V_{GS}$, is approximated as the threshold voltage, $V_{TH}$ of the transistor for currents in the range of 1-50 μA. Depletion-mode NMOS transistors have negative $V_{TH}$. The ion current, $I_{ION}$ can be calculated by applying KVL (Kirchoff's Voltage Law) around the gate-to-source loop.

$$I_{ION} = \frac{-V_{GS}}{R_s} \sim \frac{-V_{TH}}{R_S} \qquad (1)$$

Figure 5:
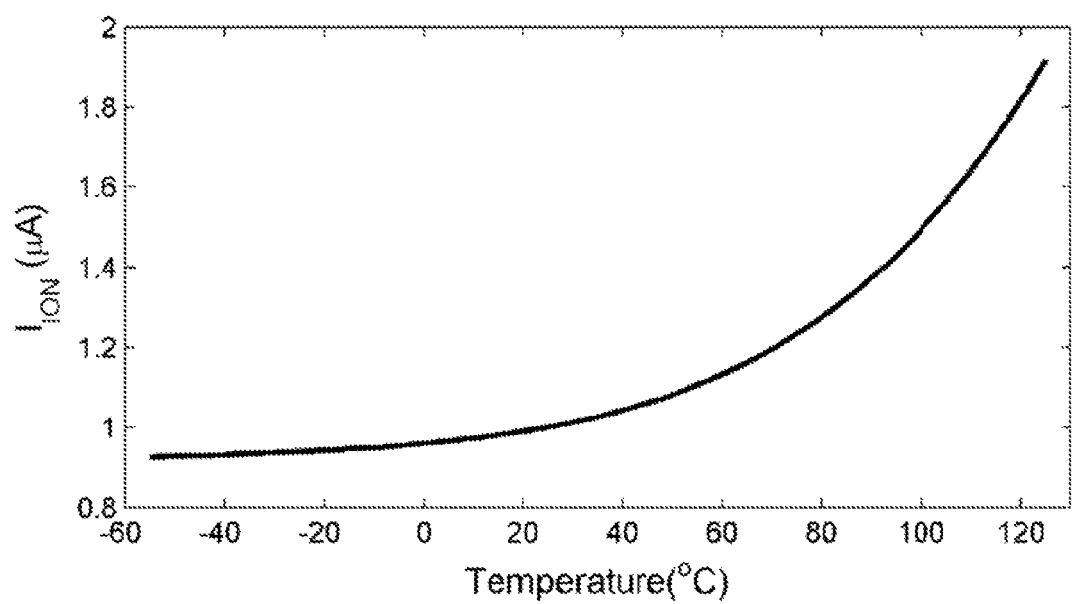
FIG. 5 is a graph which illustrates temperature instability of a depletion mode current regulator.

Based on that formula, it can be seen that $I_{ION}$ depends on $V_{TH}$, which is a function of both temperature and process. The current regulator of FIG. 4 is simulated with a IXTY 01N 100D high-voltage depletion-mode NMOS transistor, manufactured by IXYS Corp., and a low-temperature-coefficient 25-ppm resistor. A temperature sweep is illustrated FIG. 5. A 100% variation in the current $I_{ION}$ over the temperature ranges from −55° C. to 125° C.

Moreover, normal process variation in threshold voltage can require independent calibration of each depletion-mode device in order to establish a known current.

The depletion-mode current regulator has several advantages. It is simple and has an extremely low cost. It can operate at any high-voltage $V_{HV}$, in both positive and negative mode, because it floats on the supply. Voltage compliance ($V_{CR}$ in FIG. 4) is limited by the breakdown voltage of the depletion-mode device itself. The depletion-mode current regulator, however, has temperature sensitivity.

Figure 6:
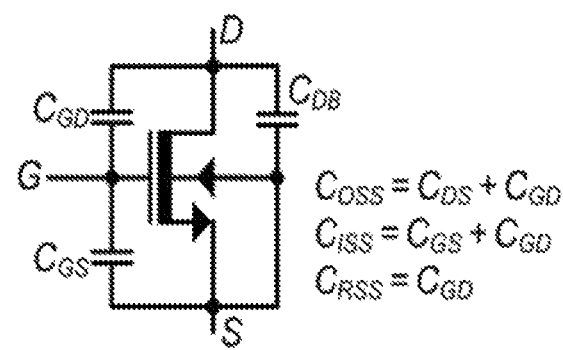
FIG. 6 is a schematic which illustrates parasitic capacitances for a depletion-mode for an N-type metal oxide semiconductor ("NMOS") transistor.

The high-voltage depletion power transistor IXTY 01N 100D has a parasitic output capacitance, $C_{OSS}$ of 25 pF at a drain-to-source voltage of 25 V (see FIG. 6). FIG. 6 illustrates details of the parasitic capacitances associated with a transistor. Output capacitance $C_{OSS}$ drops towards 2 pF as the drain-to-source voltage increases. The response time of the current regulator is fundamentally limited by the time constant created by the parasitic capacitance, $C_{OSS}$, and the effective resistance of the corona load, $R_{COR}$. For example, assuming $R_{COR}$ is 10 MΩ and $C_{OSS}$ is 2 pF, a time-constant (τ=RC) of 20 μs is created.

The current regulator also dissipates heat in the form of static power consumption. The total power dissipated is given by equation 2:

$$PD = (VHV + -VX) \times IION = VCR \times IION \qquad (2)$$

For example, for 10 μA of ion current, $I_{ION}$, and 1 kV of compliance voltage, $V_{CR}$, a total of 10 mW of power is dissipated as heat. This power dissipation can restrict the circuit's usage to low-current, high-voltage regulation applications.

Figure 7:
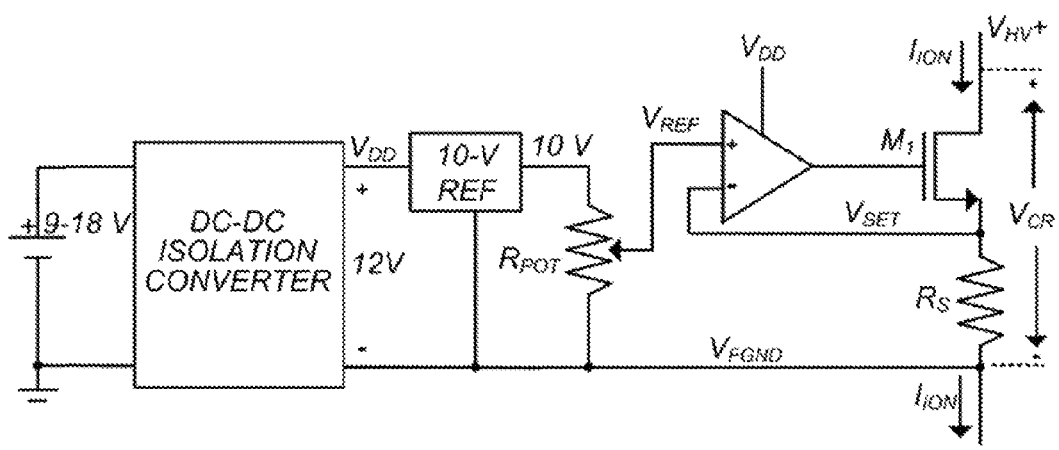
FIG. 7 is a drawing which illustrates an enhancement-mode NMOS current regulator.

Referring now to FIG. 7, an enhancement-mode current regulator according to an embodiment of the present invention is illustrated. It includes a high-voltage DC-to-DC isolation converter, a reference voltage, an operational amplifier, a precision resistor, and a high-voltage enhancement-mode NMOS transistor. A RECOM REC6-1212SRW/R10/A DC-to-DC isolation converter is preferably used and takes as input 9-18 V and converts it to a regulated 12 V supply with 10 kV isolation between the input and output terminals. As such, the output voltage can float as much as 10 kV above or below a 9-18 V ground-referenced input supply.

The output voltage of the DC-to-DC isolation converter is given to a 10 V precision voltage reference circuit to eliminate ripple on the isolation converter and to add further temperature stability. A potentiometer at the output of 10 V precision voltage reference can be used to adjust the regulated current $I_{ION}$. A CMOS rail-to-rail input/output operational amplifier is preferably used to sense the voltage drop, $V_{SET}$ across the resistor, $R_S$. The sensed voltage drop is compared with the reference voltage, $V_R$, that is applied to the non-inverting terminal of the operational amplifier. The operational amplifier changes the gate voltage of the enhancement-mode transistor in order to equalize $V_R$ and $V_{SET}$. The regulated ion current is computed by equation 3:

$$I_{ION} = \frac{V_{SET}}{R_S} = \frac{V_R}{R_S} \quad (3)$$

When the corona resistance and voltage change, which happens continuously in a real corona, the feedback opamp ensures that a constant ion current flows through the corona load.

Figure 8:
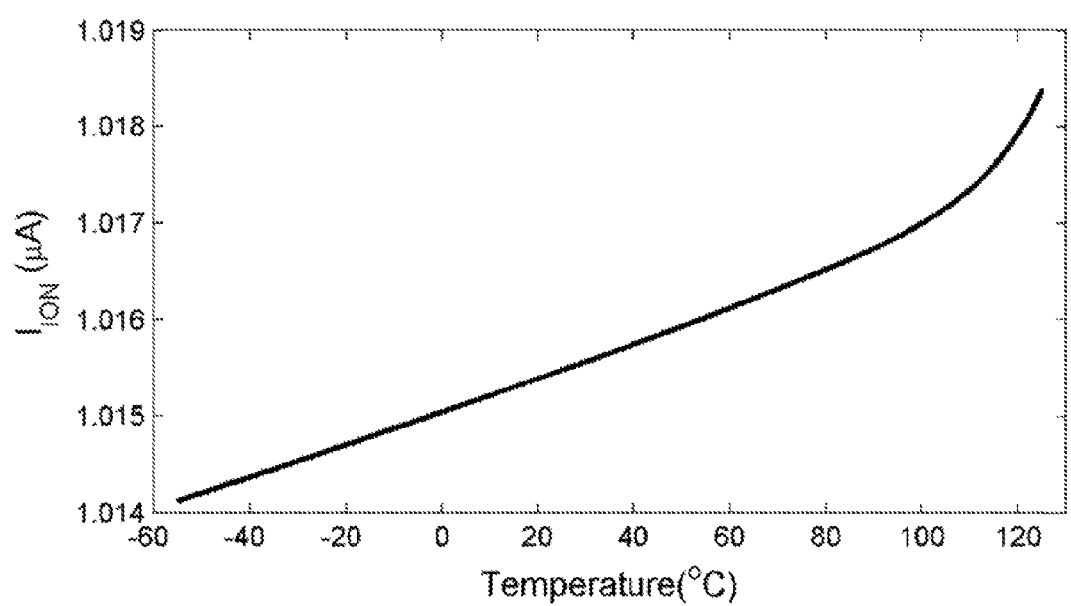
FIG. 8 is a graph which illustrates temperature stability of an enhancement-mode current regulator ("EMCR")

Temperature stability can be achieved using a low-temperature-coefficient 25-ppm resistor, $R_{SET}$, as illustrated in FIG. 8. Over a temperature range of −55° C. to 125° C., the ion current changes by less than 0.5%.

Figure 9:
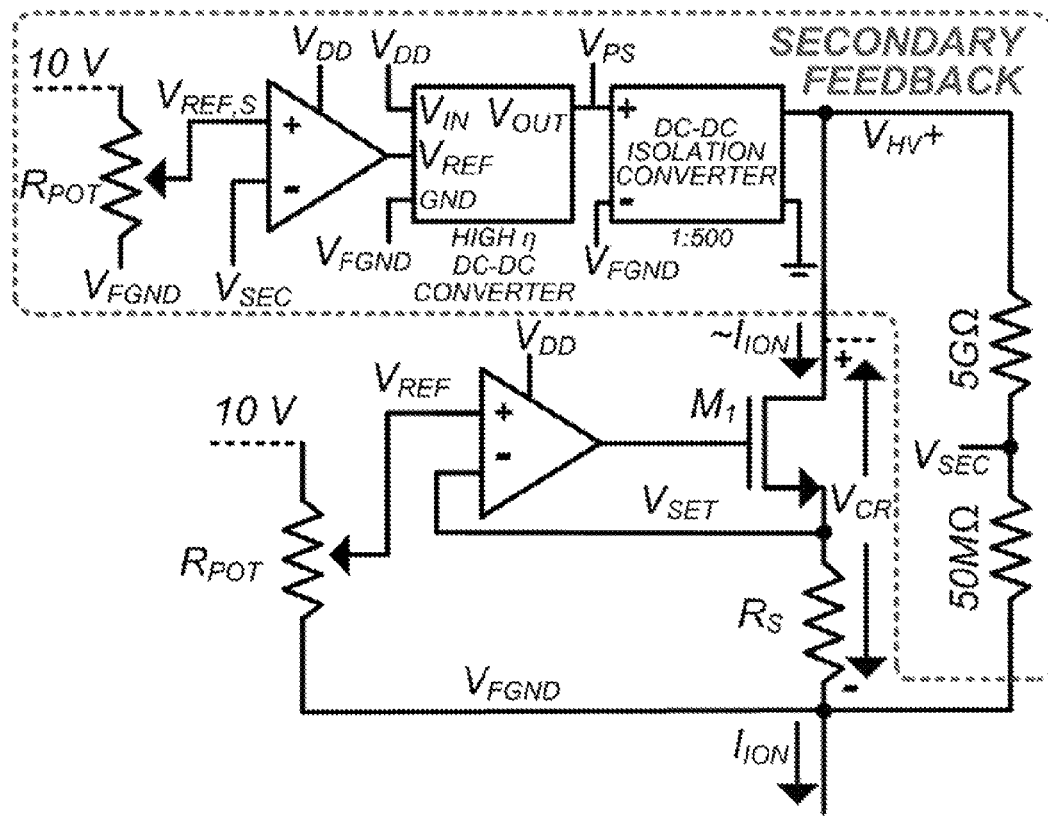
FIG. 9 is a drawing which illustrates a secondary feedback circuit according to an embodiment of the present invention.

In long-term applications, corona discharge suffers from the formation of various oxides on the metal surface, which increase the resistance of the corona. To compensate for this increase in corona resistance, the effective corona voltage has to be increased. Fixing a higher voltage on the power supply increases the power consumption of the current regulator due to an increase in the voltage across the FET. FIG. 9 illustrates an embodiment of an adaptive high-voltage power supply of the present invention. In this embodiment, the adaptive high-voltage power supply uses a secondary feedback loop to regulate the voltage across the current regulator. The compliance voltage, $V_{CR}$ is sensed using a voltage derived from a resistor divider, $V_{SEC}$, and compared to a reference voltage $V_{REF,S}$ using an amplifier. The output of the amplifier is given as a reference voltage, $V_{REF}$ to a high-efficiency DC-DC converter and the output of the DC-DC converter, $V_{PS}$ drives an unregulated DC-to-DC isolation converter that has a gain of about 500, thereby regulating $V_{CR}$. As a voltage divider is used to sense the compliance voltage across the current regulator, $V_{CR}$, the currents in the divider branch is restricted to few nA so that the current flowing to the corona, $I_{ION}$ is still approximately equal to the current flowing through FET, $M_1$.

Figure 10:
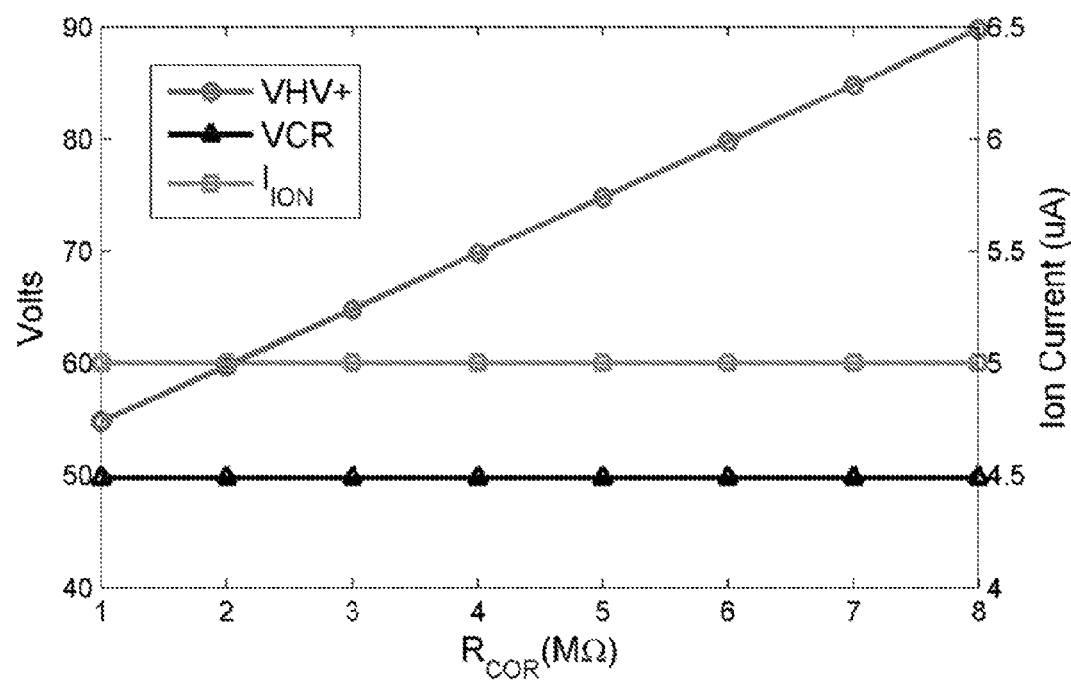
FIG. 10 is a graph which illustrates simulation of adaptive high-voltage power supply with a secondary feedback according to an embodiment of the present invention.

In one embodiment, a high voltage power supply, most preferably an American High Voltage (AHV) SC series high-voltage power supply (part SC-90 2 W) is used as a DC-to-DC isolation converter that provides a gain of about 750. FIG. 10 illustrates simulation results. To simulate long-term corrosion in the corona, the corona voltage was swept from 1 kV to 5 kV. A fixed compliance voltage, $V_{CR}$, was observed that was about 50 V, which was maintained by continuously changing the output voltage of the power amplifier, $V_{PS}$, which in turn changed $V_{HV}$, which is applied to the positive terminal of the current regulator.

An advantage of an embodiment of the present invention is that 1) the secondary feed-back circuit alone can regulate the ion current without the primary feedback circuit where speed is not a priority, 2) a constant compliance voltage is maintained across the power FET, which allows the use of a general-purpose FET with low $V_{DS,MAX}$ and low $C_{OSS}$, 3) the DC-to-DC isolation converter can be floated on another high-voltage power supply that is used for the drift tube, which reduces the total system power, 4) the solution is purely electronic in contrast to known secondary electrode methods and 5) the variable high-voltage supply greatly extends the usable life of the corona.

Figure 11:
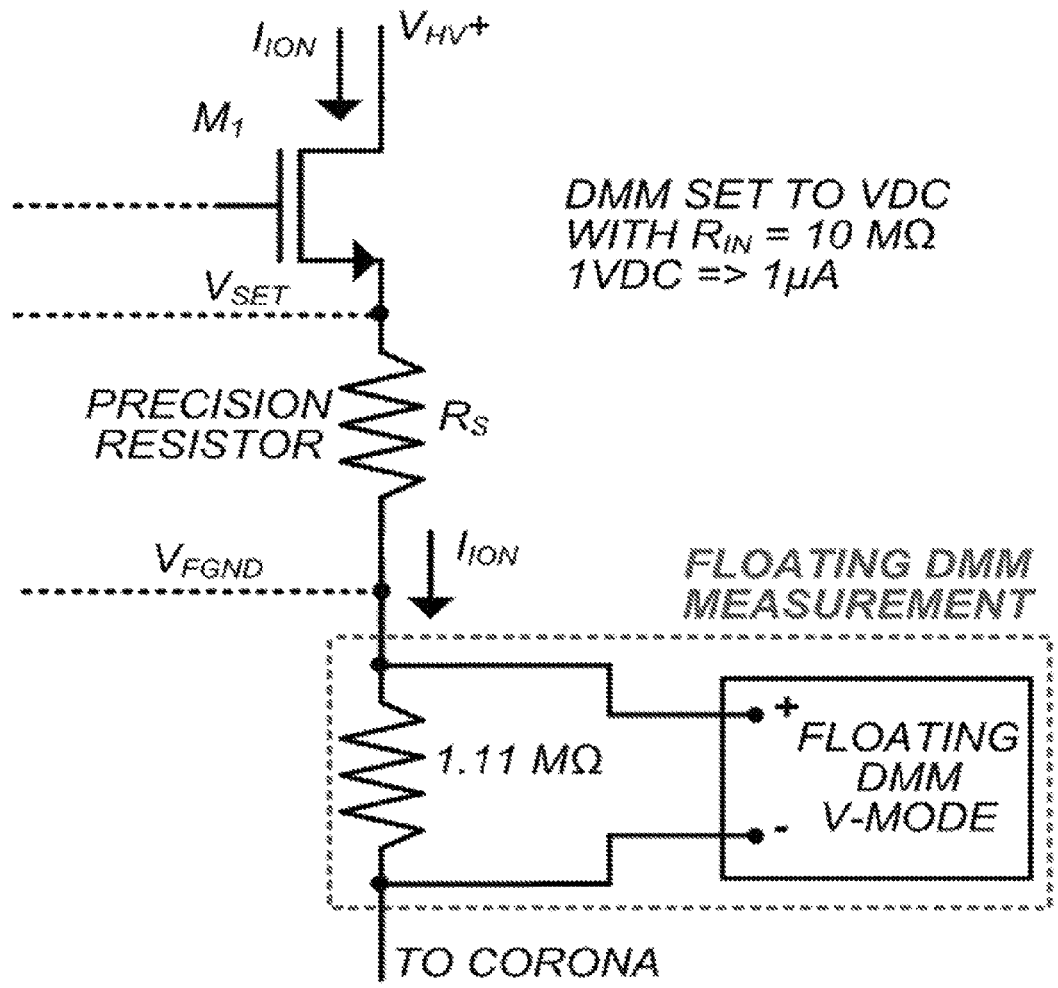
FIG. 11 is a circuit which illustrates a floating digital multi-meter ("DMM") measurement.

With regard to floating DMM Measurement, in the laboratory, ion current $I_{ION}$ can be measured using a digital multi-meter (DMM) set across a 1.11 MΩ resistor that is placed in series with the ion current (see FIG. 11). A DMM set in voltage-mode contains a 10.0 MΩ internal resistance. This 10.0 MΩ DMM resistance in parallel with the 1.11 MΩ series resistor forms an effective resistance of 1.00 MΩ. Thus, a 1.00 VDC reading on the floating DMM in voltage-mode is equivalent to 1.00 μA of ion current, $I_{ION}$. Measuring current in voltage-mode allows for high-resolution current readings from the DMM.

Current monitoring can be provided by using a floating DMM to provide a precise measurement. However, because the measurement instrument is floating at a high voltage, it is not possible to communicate with a ground-referenced computer directly to sense and record the ion current in the current regulator.

Figure 12:
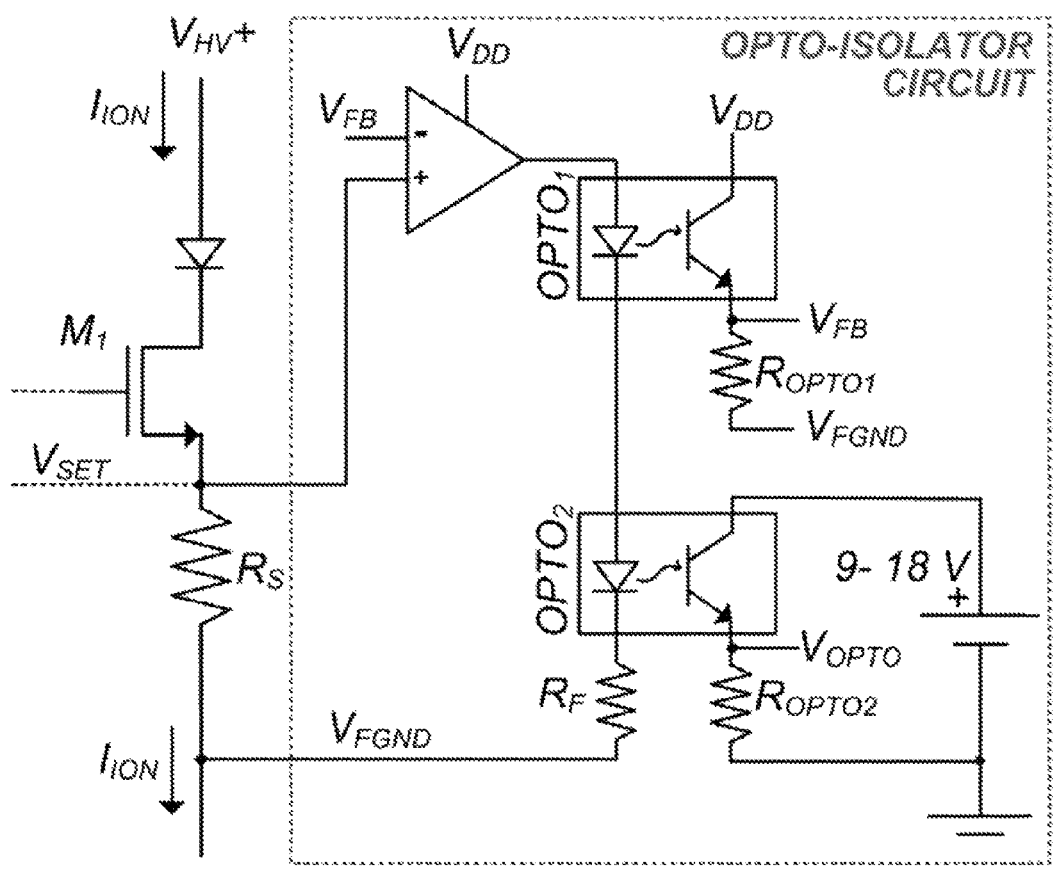
FIG. 12 is a schematic which illustrates a ground-referenced current monitoring circuit which uses a pair of identical opto-isolators.

For safe current monitoring, an opto-isolator is preferably used to transfer the floating voltage measurement to a ground reference. Linear signal transfer from the floating side to the ground side is useful for accurate current monitoring. Linear opto-isolators, available in the market, provide DC voltage isolation of up to about 7.5 kV. For precise linear current monitoring beyond 7.5 kV isolation, a linearizing technique is preferably introduced using two matched non-linear opto-isolators with 15 kV of isolation and an opamp as illustrated in FIG. 12.

Two matched identical opto-isolators are preferably connected in series so that their input LEDs have the same current flowing through them. Resistor $R_F$ is preferably used to limit the current flowing through the LEDs. A rail-to-rail CMOS opamp is preferably used to sense the ion current, $I_{ION}$, at node $V_{SET}$, and compare it to $V_{FB}$, the feedback voltage at the emitter terminal of opto-coupler $OPTO_1$. The opamp changes the current in the LEDs in such a way that voltage $V_{FB}$ is equal to $V_{SET}$, making the voltage transfer through $OPTO_1$ linear. As the current through two matched opto-isolator LEDs is equal, the emitter-to-ground voltage of the ground-referenced opto-isolator $OPTO_2$, $V_{OPTO}$, will also be equal to $V_{FB}$.

Figure 13:
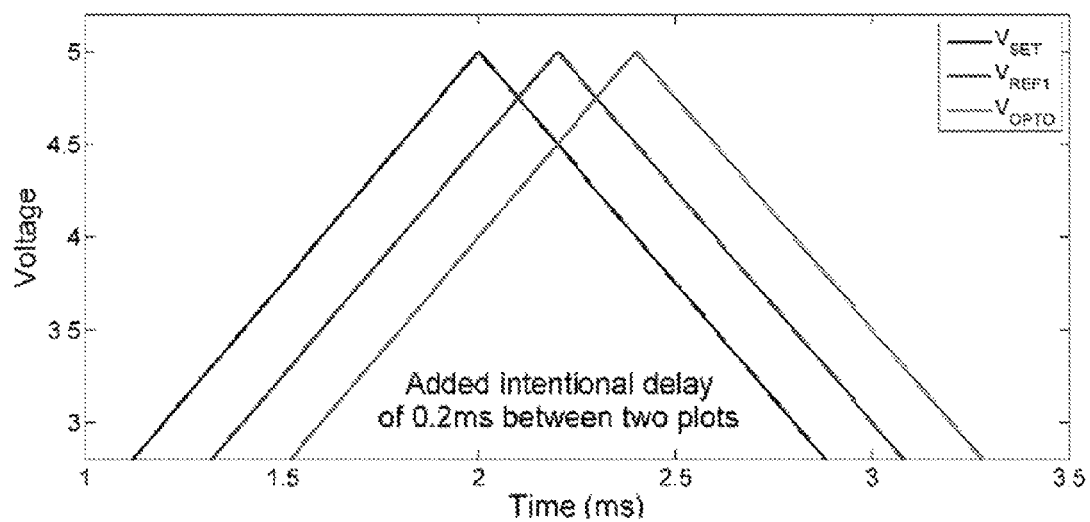
FIG. 13 is a graph which illustrates voltage as a function of time for the circuit of FIG. 12.

The advantages of this embodiment include high DC-DC isolation, and linear current monitoring because the non-linear behavior of opto-isolator $OPTO_2$ is compensated and corrected through $OPTO_1$ and the opamp. Measurement results of this arrangement are illustrated in FIG. 13. An intentional delay is preferably added in order to clearly show the three voltages. For highly accurate voltage transfer using this embodiment, the two opto-isolators are preferably closely matched. Alternatively, the ground-referenced resistor, $R_{OPTO2}$, can be adjusted in order to make the voltage transfer more accurate.

Figure 14:
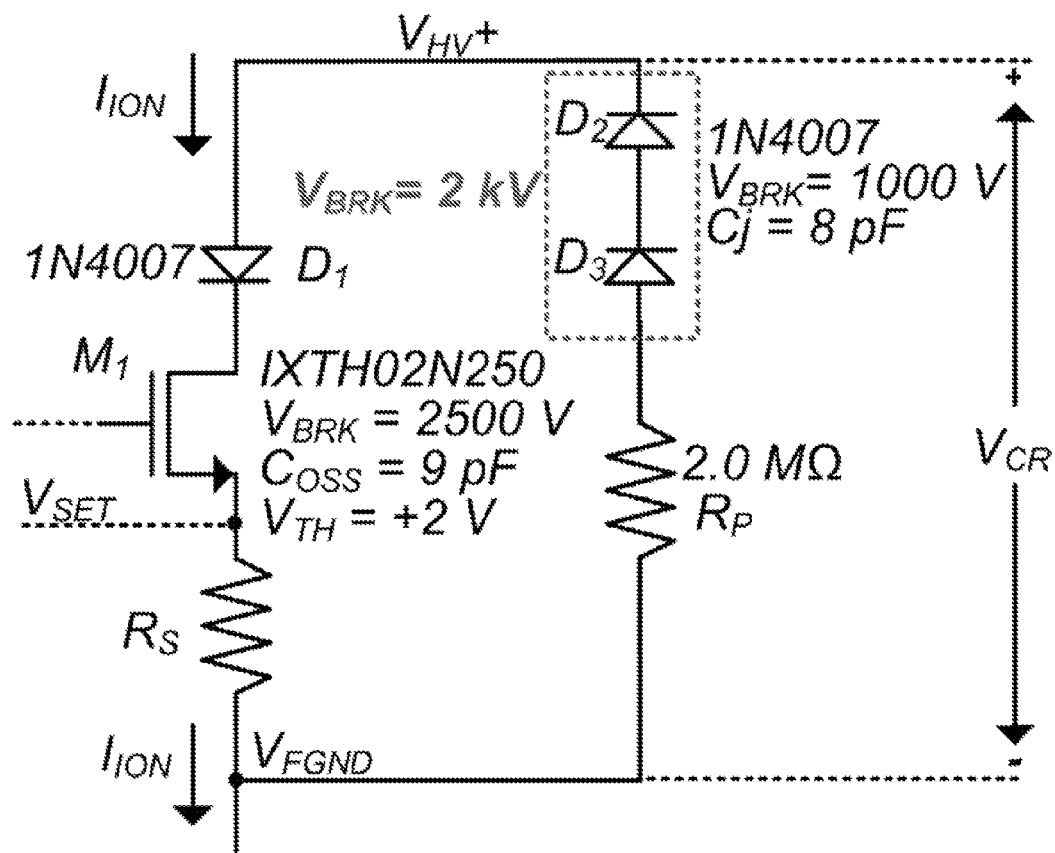
FIG. 14 is a drawing which illustrates a circuit that provides over-voltage and reverse-voltage protection.

Adding protection to the circuit is of course often desirable when working with high voltages. FIG. 14 illustrates an embodiment of the protection circuitry which can be provided. Diode $D_1$ is used to protect transistor $M_1$ from reverse voltage. Diodes $D_2$ and $D_3$ protect transistor $M_1$ from overvoltage. Series resistor $R_P$ protects diodes $D_2$ and $D_3$ from dangerously high currents when diodes $D_2$ and $D_3$ conduct.

Figure 15:
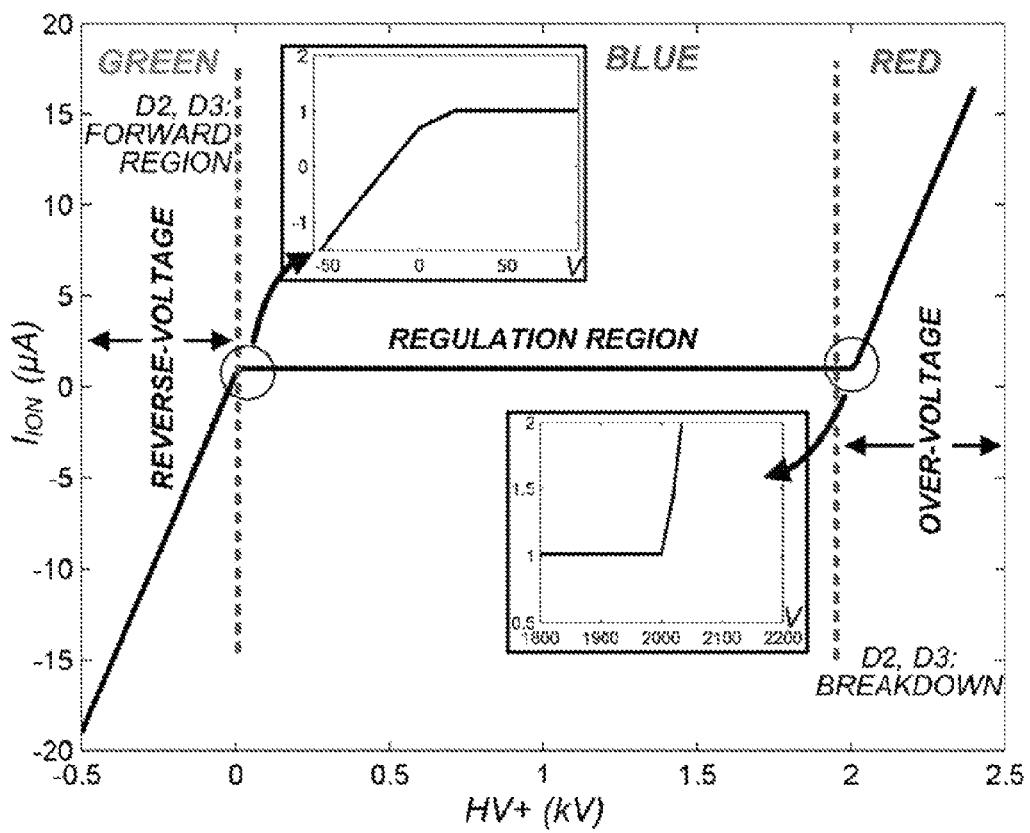
FIG. 15 is a graph and charts which illustrates three different regions of operation that are represented by a tri-color light emitting diode ("LED") according to an embodiment of the present invention.

FIG. 15 indicates the three regions of operation of the protection circuitry. In the regulation region, current $I_{ION}$ is constant and protection diodes $D_1$, $D_2$, and $D_3$ are off. When a reverse-voltage is applied, diodes $D_2$ and $D_3$ conduct through resistor $R_P$ and diode $D_1$ protects transistor $M_1$. Finally, an over-voltage condition occurs when the voltage applied across the current regulator $V_{CR}$ approaches the breakdown voltage of transistor $M_1$, diodes $D_2$ and $D_3$ enter the breakdown region first, forming a low resistance current path to protect $M_1$. In particular, the IXYS high-voltage enhancement power transistor, IXTH02N 250 has a breakdown voltage of 2.5 kV. To protect the transistor, two 1N4007 diodes are connected in series, providing an effective a breakdown voltage of 2 kV.

Figure 16:
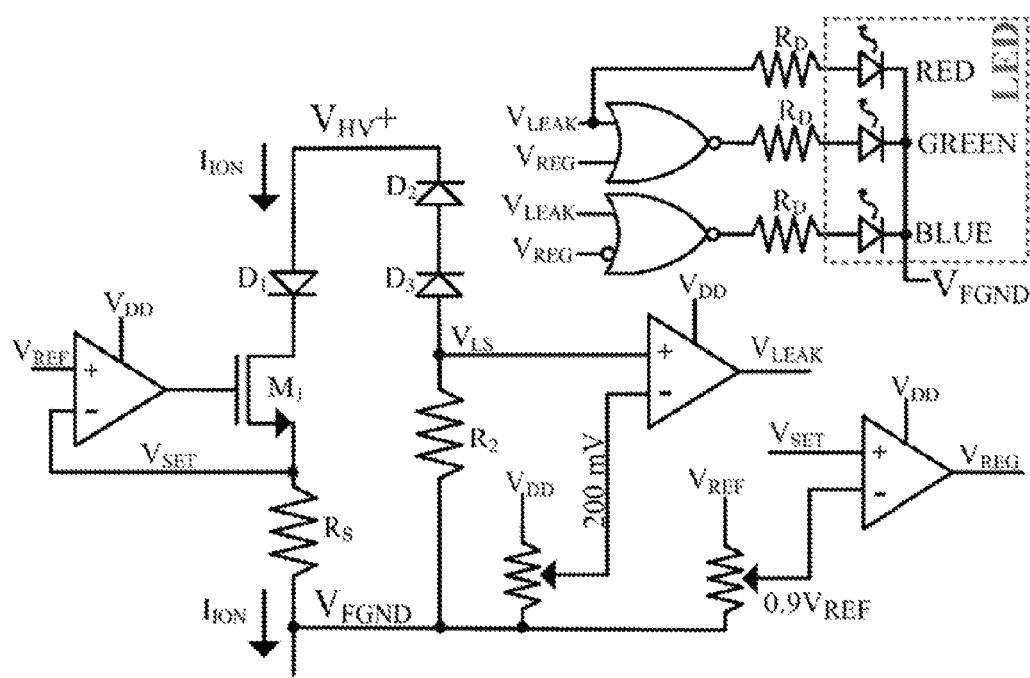
FIG. 16 is a schematic view drawing which illustrates a circuit that causes a tri-color LED to indicate three regions of operation of an EMCR.

Although virtually any indicator can be arranged to provide desirable results, in one embodiment, a tri-color LED is most preferably used to indicate the three regions of operation of the enhancement-mode current regulator, as illustrated in FIGS. 15 and 16. The Reverse-Voltage region is sensed by comparing the voltage, $V_{SET}$, with a reference voltage equal to 0.9 $V_R$. $V_{SET}$ is preferably set by the ion current, $I_{ION}$. When an insufficient HV+ voltage is applied, $V_{SET}$ is less than 0.9 $V_R$ and the regulation sensed voltage, $V_{REG}$, is preferably pulled low. When a sufficient HV+ voltage is applied for a desired current and the current is regulating, the regulation sensed voltage, $V_{REG}$, is preferably pulled high.

The three diodes in one embodiment of the current regulator preferably provide protection from over-voltage. Sensing the leakage current through diodes $D_2$ and $D_3$ mitigates the destruction of the diodes, as well as the transistor they are trying to protect. A diode leakage current of 100 nA through $D_2$ and $D_3$ with a diode protection resistor, $R_2$, of 2 MΩ, generates a leak-sense voltage $V_{LS}$ of 200 mV. $V_{LS}$ is preferably compared with a 200 mV reference voltage, which can be generated using a potentiometer, to create the digital output voltage, $V_{LEAK}$.

In one embodiment, combinational logic with digital regulation voltages $V_{REG}$ and leak voltage $V_{LEAK}$ preferably drive the RGB (red, green, blue) pins of the tri-color LED. The different colors can signify different conditions. For example, in one embodiment, the green color can signify that HV+ should be increased. The blue color can signify that the current is being regulated. When a high HV+ voltage is applied such that current regulator compliance voltage, $V_{CR}$, is higher than the breakdown voltage of the diodes, the LED color can turn red. The three regions of operation of the current regulator with a tri-color LED are illustrated shown in FIG. 15.

Embodiments of the present invention: 1) regulate (makes constant) current from a high-voltage power supply to a grounded load; 2) can be placed in series between the high-voltage power supply (either positive or negative terminals) and a load; 3) operate with high voltage isolation (approximately 10 kilovolts), regulates over a high voltage range (approximately 1 kilovolt), and operate at low currents (sub-milliampere, for example 1 microampere); 4) find application in regulating the ion current in a corona discharge device, ion-mobility spectrometry (IMS), and differential mobility spectrometry (DMS), a common ion source is from corona discharge, which requires a high-voltage power supply. The production of ions can be made more constant by regulating the current through the corona by placing an embodiment of the invention in series between the high-voltage terminal of the supply and the corona load.

Embodiments of the present invention can also provide: 1) high-voltage compliance (voltage across current source), for example optionally at least 1.5 kilovolts; 2) high-voltage isolation, for example optionally at least 10 kilovolts, so that it can be used at either the high or low terminals; 3) the ability to be programmable as a sub-milliampere current regulator, for example, optionally with a range of at least about 100 nano-amperes to about 10 microamperes; 4) protection from over-voltage across the terminals and reverse polarity; and 5) precise monitoring of current is possible using a standard digital multi-meter set on DC voltage setting.

Figure 26:
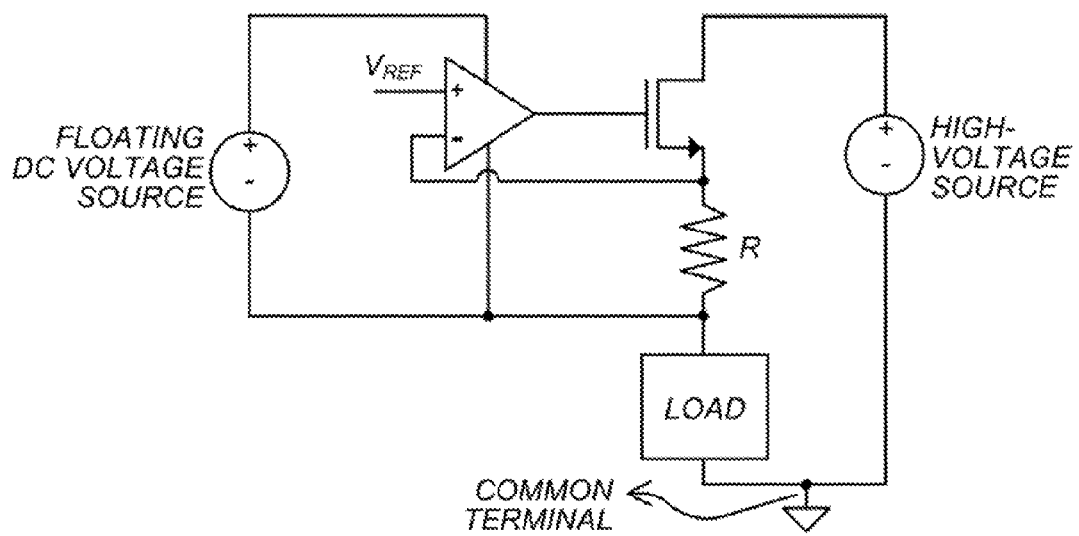
FIG. 26 is a schematic drawing which illustrates a current regulator circuit using an NMOS transistor according to an embodiment of the present invention.

As best illustrated in FIG. 26, in one embodiment, the current leaving the positive terminal of a high-voltage source can be regulated using an NMOS transistor and source resistor R with negative feedback. An operational amplifier can be used to adjust the gate-to-source voltage of the NMOS transistor such that the amount of current delivered to a load is a constant equal to $V_{REF}/R$, where $V_{REF}$ is referenced to the negative terminal of a floating DC voltage source. The operational amplifier is preferably powered by the floating DC voltage source with high voltage isolation. The load can share a common terminal with the negative terminal of the high-voltage source.

Figure 27:
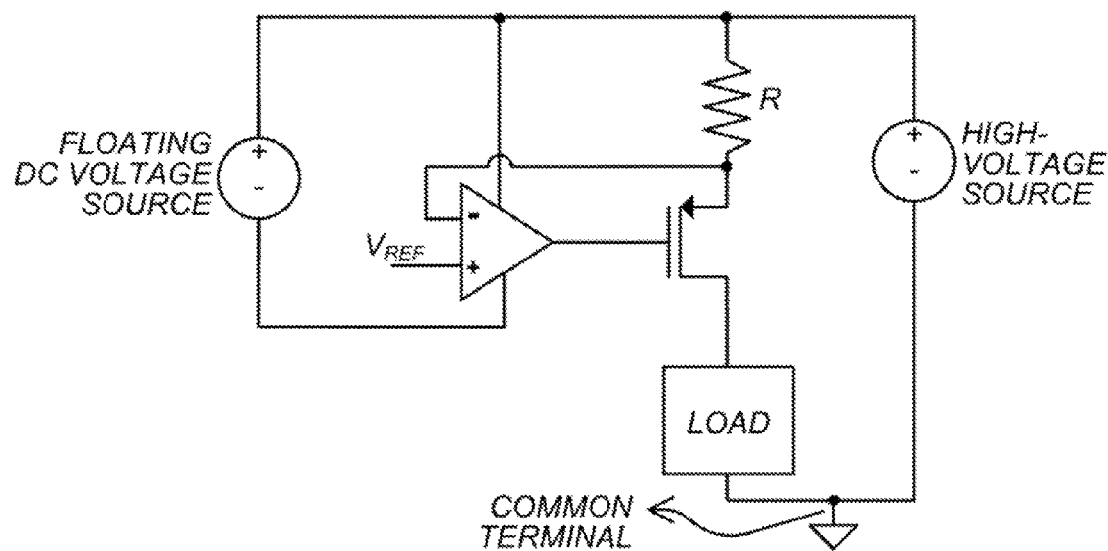
FIG. 27 is a schematic drawing which illustrates a complimentary circuit of the circuit of FIG. 26 which uses a PMOS transistor according to an embodiment of the present invention.

FIG. 27 illustrates the complimentary circuit of FIG. 26, in which the NMOS transistor is replaced with a PMOS transistor. The constant current delivered to the load in this embodiment is $-V_{REF}/R$, where $V_{REF}$ is preferably referenced to the positive terminal of the floating DC voltage source.

Figure 28:
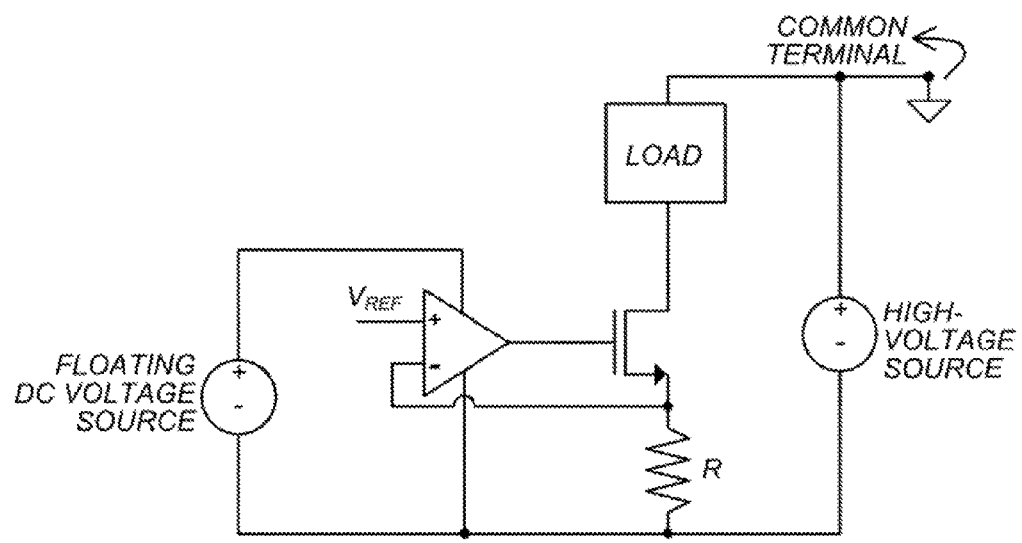
FIG. 28 is a schematic drawing which illustrates a current regulator circuit using an NMOS transistor.

As best illustrated in FIG. 28, in one embodiment, the current entering the negative terminal of a high-voltage source can be regulated using an NMOS transistor and source resistor R with negative feedback. An operational amplifier is preferably used to adjust the gate-to-source voltage of the NMOS transistor such that the amount of current delivered to the load is a constant equal to $V_{REF}/R$, where $V_{REF}$ is referenced to the negative terminal of a floating DC voltage source. In this figure, the load shares a common terminal with the positive terminal of the high-voltage source.

Figure 29:
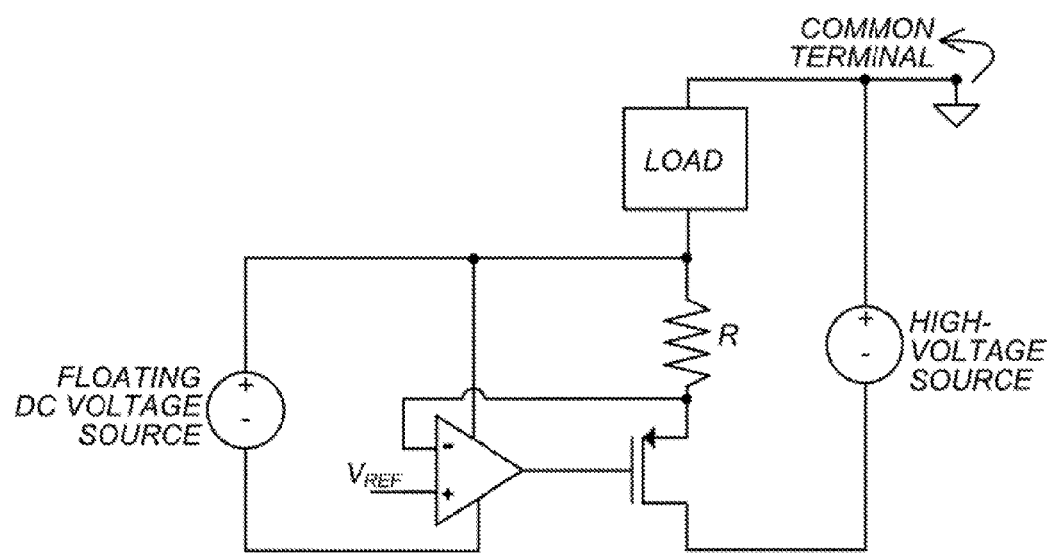
FIG. 29 is a schematic drawing which illustrates a complimentary circuit of the circuit of FIG. 28 which uses a PMOS transistor according to an embodiment of the present invention.

FIG. 29 illustrates an embodiment of the present invention which is a complimentary circuit of FIG. 28. As best illustrated in FIG. 29, in one embodiment, the NMOS transistor can be replaced with a PMOS transistor. The constant current delivered to the load in this embodiment is $-V_{REF}/R$, where $V_{REF}$ is preferably referenced to the positive terminal of the floating DC voltage source.

FIGS. 30A, 30B, and 30C illustrate circuits for three embodiments of the present invention, each of which can optionally be used to generate $V_{REF}$. All three embodiments can be powered by the floating DC voltage source. FIG. 30A uses a reference circuit to generate $V_{REF}$. FIG. 30B two resistors R to form a voltage divider. FIG. 30C illustrates an embodiment wherein a reference circuit is connected to a voltage divider.

Figure 31:
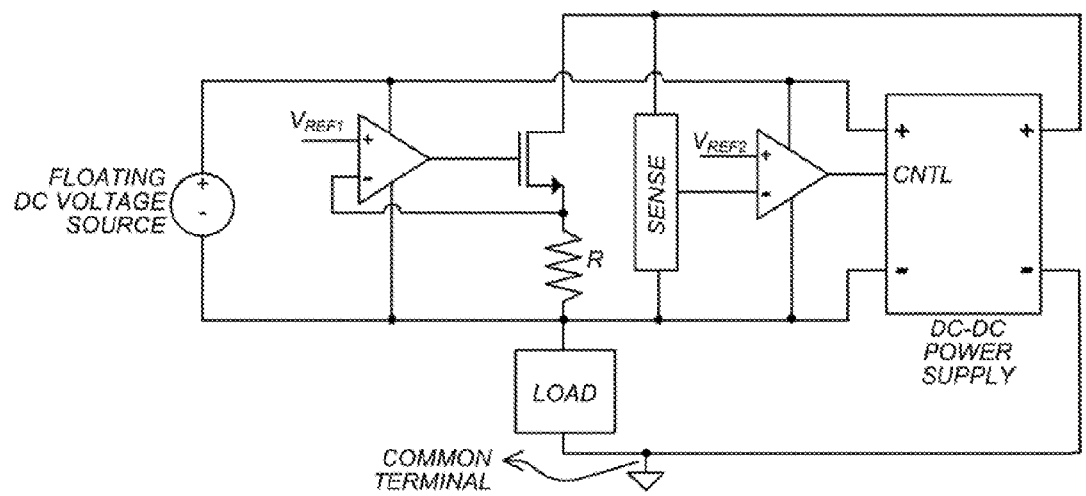
FIG. 31 is a schematic drawing which illustrates a feedback loop that is added to the high-voltage current regulator of FIG. 26.

As best illustrated in FIG. 31, in one embodiment, a second feedback loop can be added to the high-voltage current regulator embodiment illustrated in FIG. 26. The voltage across the transistor and series resistor R is measured using a sense circuit and compared to a second reference voltage, $V_{REF2}$. The output of a second operational amplifier can be used to adjust the output voltage of a DC-DC power supply via a control input terminal. The DC-DC power supply preferably receives input power from a floating DC voltage source. The output of the DC-DC power supply preferably forms the high-voltage source for the load.

Figure 32:
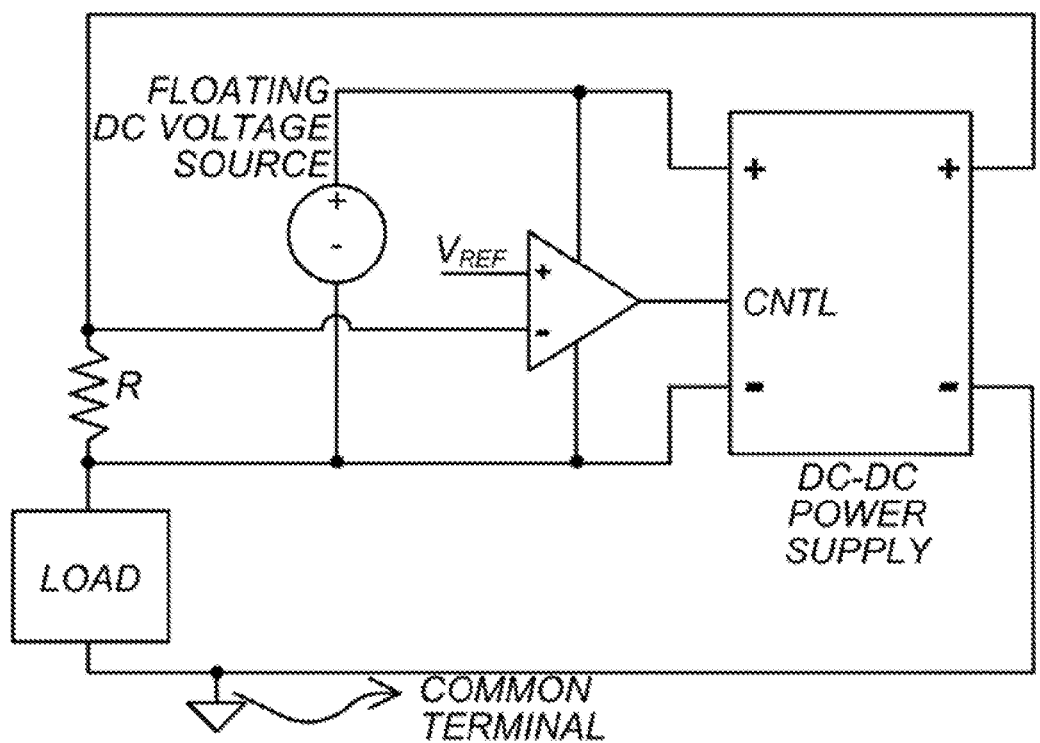
FIGS. 32 and 33 are schematic drawings of alternative embodiments of a high-voltage current regulator according of the present invention.

In the embodiment illustrated in FIG. 32, the current leaving the positive terminal of a DC-DC power supply is preferably regulated using a resistor R with negative feedback. An operational amplifier adjusts the output voltage of a DC-DC power supply via the control input terminal. The amount of current delivered to a load is a constant equal to $V_{REF}/R$, where $V_{REF}$ is referenced to the negative terminal of a floating DC voltage source. In this embodiment, the operational amplifier is powered by the floating DC voltage source. The DC-DC power supply preferably receives input power from the floating DC voltage source as well. The output of the DC-DC power supply preferably forms a high-voltage source for the load. The load can share a common terminal with the negative terminal of the DC-DC power supply.

Figure 33:
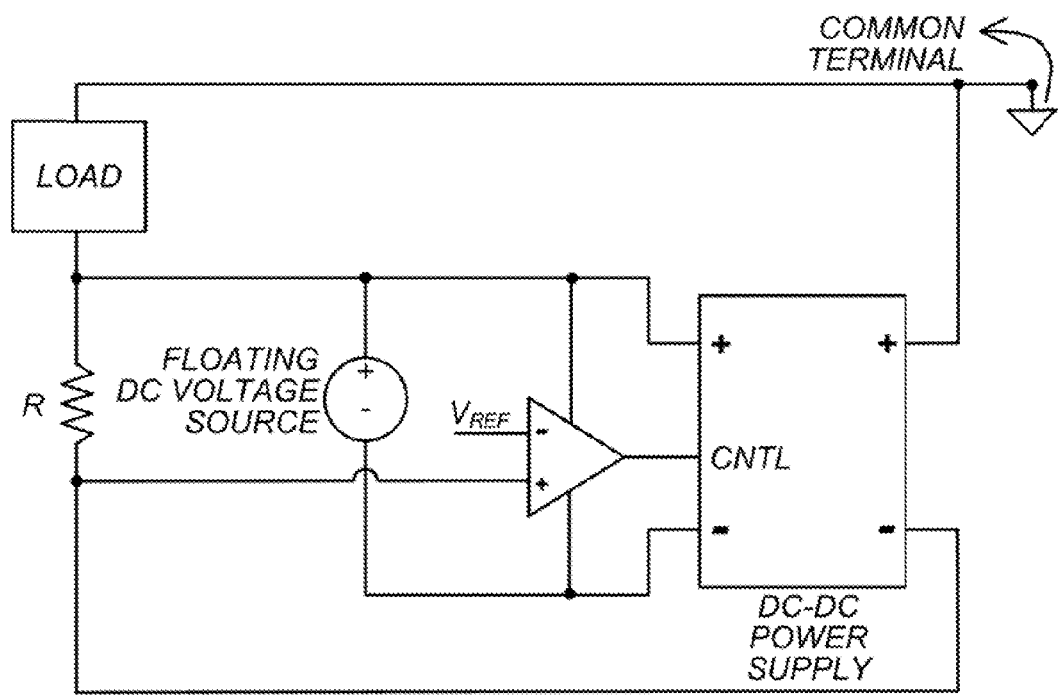

Referring now to FIG. 33, in one embodiment, the current entering the negative terminal of a DC-DC power supply can be regulated using a resistor R with negative feedback. In this embodiment, an operational amplifier adjusts the output voltage of a DC-DC power supply via the control input terminal. The amount of current delivered to a load is a constant equal to $-V_{REF}/R$, where $V_{REF}$ is most preferably referenced to the positive terminal of the floating DC voltage source. The DC-DC power supply can receive input power from the floating DC voltage source. The output of the DC-DC power supply preferably forms a high-voltage source for the load. In this embodiment, the load preferably shares a common terminal with the positive terminal of the DC-DC power supply.

Embodiments of the present invention can be used in any high voltage device which can benefit from a well-regulated current supply, including but not limited to ion-mobility spectrometry (IMS) and/or differential ion-mobility spectrometry (DMS). Some applications include chemical weapons detection, explosives detection, drug detection, air quality monitoring, and analysis of chemical and biological materials. In one embodiment, only the primary or only the secondary feedback circuit described herein can be used and will provide desirable results. Although embodiments of the present invention discussed herein are most preferably configured such that they can easily be adjusted by adjusting a potentiometer, in one embodiment, the potentiometer and its associated circuitry are not used—instead, a predetermined voltage is input into the input terminal of the operational amplifier such that the primary and/or secondary feedback circuit will output a constant predetermined current. In one embodiment, any apparatus or device capable of producing an adjustable voltage can be used in place of the potentiometers and their associated circuitry.

INDUSTRIAL APPLICABILITY

The invention is further illustrated by the following non-limiting examples.

Example 1

Electrical Tests with Constant Resistive Load.

Figure 17:
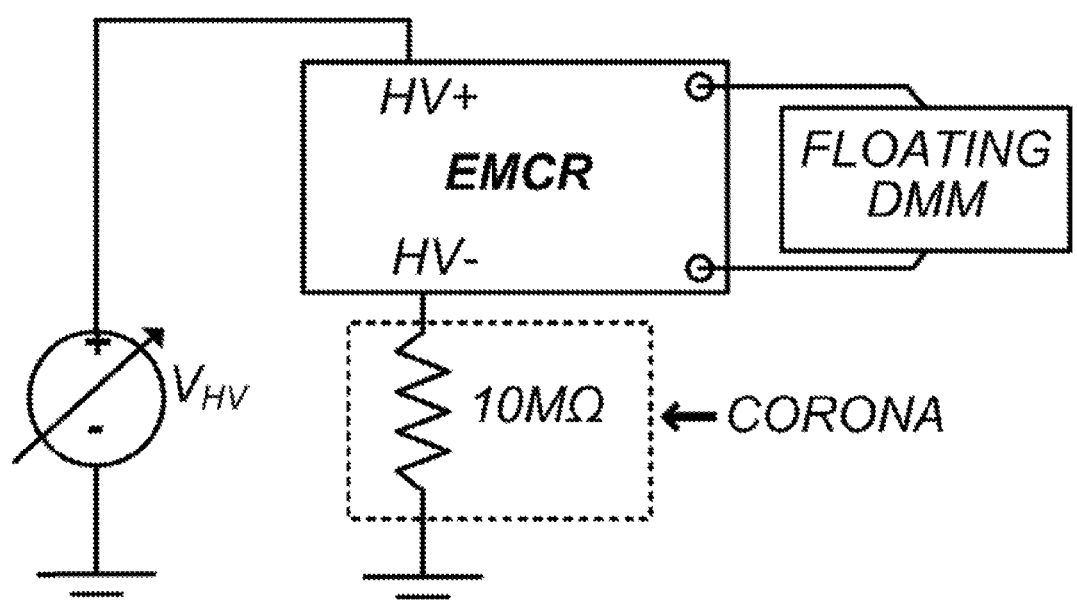
FIG. 17 is a schematic view drawing which illustrates an EMCR test bench with a resistive load applied.

An enhancement-mode current regulator according to an embodiment of the present invention was constructed and tested with a resistive load, RL, of 10 MΩ as illustrated in FIG. 17. A single 1N4007 diode was used instead of two diodes because the measured breakdown voltage of a single 1N4007 diode is higher than the rated value. For instance, one 1N4007 diode has a measured breakdown voltage of approximately 1.4 kV, which is higher than the rated breakdown of 1 kV.

Figure 18:
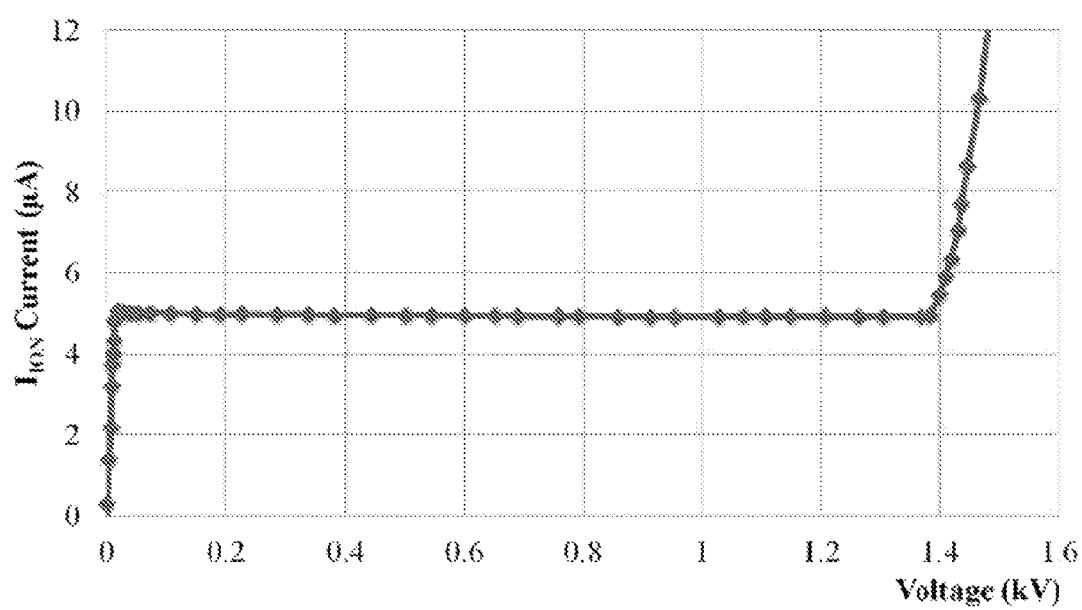
FIG. 18 is a graph which illustrates ion current as a function of voltage for a current regulator with a 10M Ohm corona resistive load.

Referring now to FIG. 18, the measured current regulator I-V characteristics are shown with a regulated ion current $I_{ION}$ of 5 μA. When $V_{HV+}$ of ~1.4 kV is applied, the diode conducts current and protects the transistor.

Figure 19:
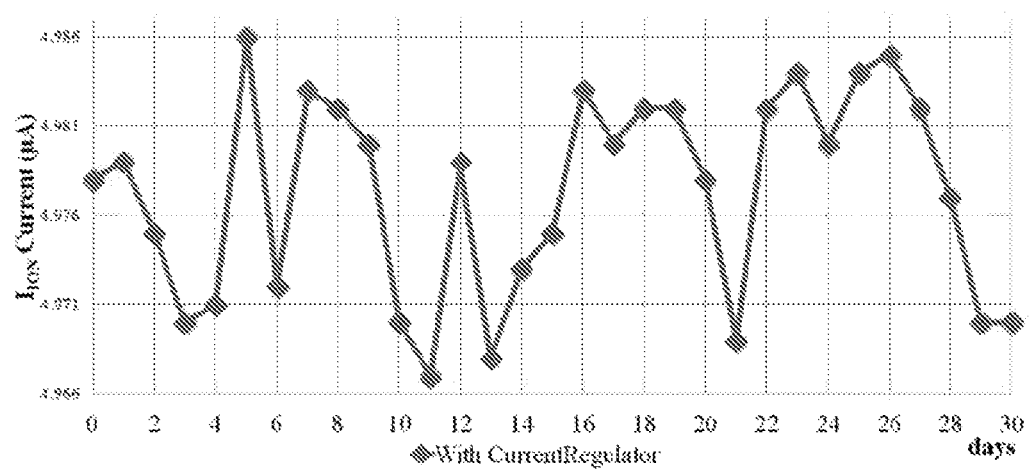
FIG. 19 is a graph which illustrates ion current as a function of time for a current regulator with a fixed resistive load.

The stability of the current regulator was tested with a 10 MΩ resistive load continuously for one month. The ion current was set to approximately 5 μA and the high-voltage supply $V_{HV+}$ set to 500 V. Results of the stability test for one month are illustrated in FIG. 19. A maximum variation of ±0.58% was observed.

Example 2

Electrical Tests with Point-to-Plane Corona Load.

Figure 20:
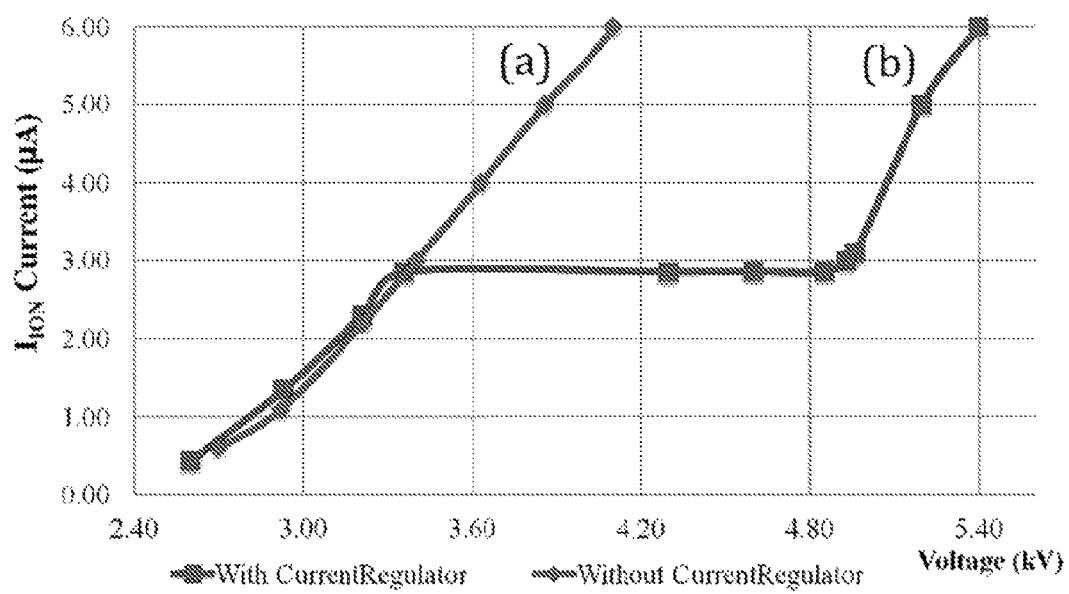
FIG. 20 is a graph which illustrates ion current as a function of voltage of a positive-mode point-to-plane corona with (a) and without (b) the current regulator.

Positive-mode: A point-to-plane corona was constructed using a general-purpose stainless steel sewing needle. The corona needle and the plane were 5 mm apart. The plane was a piece of aluminum measuring approximately 25 mm×40 mm×2 mm. For a 5 mm point-to-plane distance, a positive supply voltage $V_{HV+}$ of at least 2.5 kV was needed to obtain an ion current in the order of micro-amperes. Programming the current regulator to a desired current of 3 μA, the I-V measured characteristics of the point-to-plane corona in positive mode with and without a current regulator are illustrated in FIG. 20.

The desired ion current of 3 μA was achieved at a minimum voltage of $V_{HV+}$=3.5 kV. The point-to-plane corona without the current regulator shows steadily increasing current increasing $V_{HV+}$ beyond 3.5 kV. On the other hand, for the point-to-plane corona with the current regulator, the current was regulated for $V_{HV+}$ in the range from 3.5-4.9 kV. As such, the measured voltage compliance range was 1.4 kV, which was set by the single 1N4007 diode with a measured breakdown voltage of 1.4 kV. Choosing a transistor with a higher breakdown voltage and using appropriate over-voltage protection diodes can increase the current regulation range.

To test the stability of the current regulator, two experiments were conducted with and without the voltage regulator continuously for one month. Three identical coronas were constructed out of which two were used for the experiment and the other one was left on the same experiment table to study the effects of the laboratory environment.

For the stability test without a current regulator, $V_{HV+}$ was set to 3.6 kV such that 3 μA of ion current initially flowed through the point-to-plane corona. For the point-to-plane corona with the current regulator, $V_{HV+}$ was set to 4.6 kV for 3 μA of ion current. Notice that 4.6 kV is close to the upper bound of the regulation region which was 3.5 to 4.9 kV.

As the corona is made of metal, when exposed to high voltages in air for a long time, metal oxides form on the surface, increasing the effective voltage and resistance of the corona. As the corona voltage and resistance increased, the regulation range shifted to the right requiring a higher voltage. For the stability test with the current regulator, $V_{HV+}$ was set near the upper bound so that it would operate continuously for a long amount of time.

Figure 21:
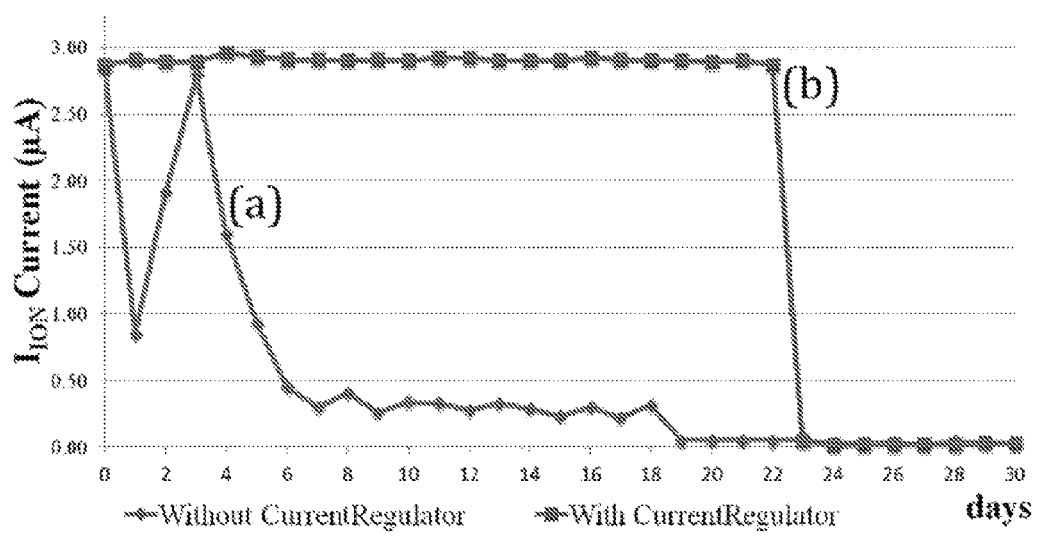
FIG. 21 is a graph which illustrates ion current as a function of time for a positive mode point-to-plane corona stability test with (a) and without (b) the current regulator connected.

Stability test results of the ion current with point-to-plane corona load are shown in FIG. 21. In less than one day, the corona source without the current regulator showed enormous deviations and never returned to its initial value of 3 μA after a period of 2 days. For the point-to-plane corona with current regulator, it took 23 days for the initially set $V_{HV+}$ of 4.6 kV to move to the lower bound of the regulation region and effectively turn off the corona ion source. To maintain constant ion current, $I_{ION}$, for more days, the regulation range can be increased by choosing transistors and protection diodes with higher breakdown voltages.

Figure 22:
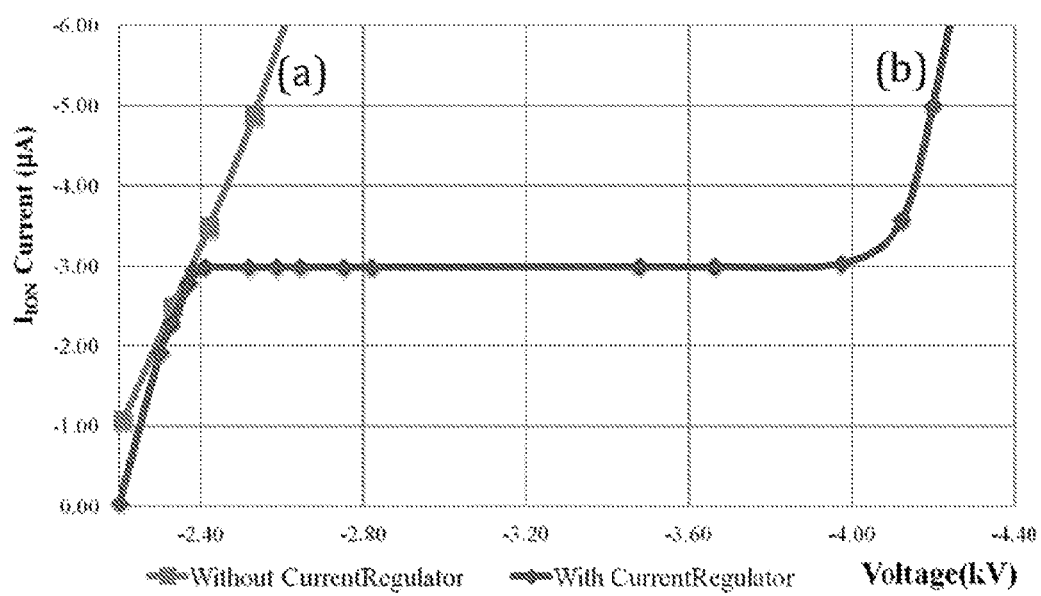
FIG. 22 is a graph which illustrates ion current as a function of voltage for a negative-mode point-to-plane corona without (a) and with (b) the current regulator.

Negative-mode: For the negative-mode test, three point-to-plane corona were constructed identical to those constructed for the positive-mode tests. For a 5 mm point-to-plane distance, a negative supply voltage $V_{HV-}$ of at least −2.2 kV was needed to obtain an ion current in the order of micro-amperes. Programming the current regulator to a desired current of 3 μA, the I-V measured characteristics of the point-to-plane corona in negative mode with and without a current regulator are illustrated in FIG. 22.

The desired ion current of 3 μA was achieved when $V_{HV-}$, was equal to −2.4 kV. The point-to-plane corona without the current regulator shows rapidly increasing negative current with further increases in $V_{HV-}$. On the other hand, for the point-to-plane corona with current regulator, the current was unchanged for $V_{HV-}$ in the range from −2.4 kV to −4.1 kV.

For the stability test without a current regulator, $V_{HV-}$ was set to −2.5 kV such that 3 μA of ion current initially flowed through the point-to-plane corona. For the point-to-plane corona with the current regulator, $V_{HV-}$ was set to −4.0 kV for 3 μA of ion current, close to the upper bound of the regulation region which was −4.1 kV.

Figure 23:
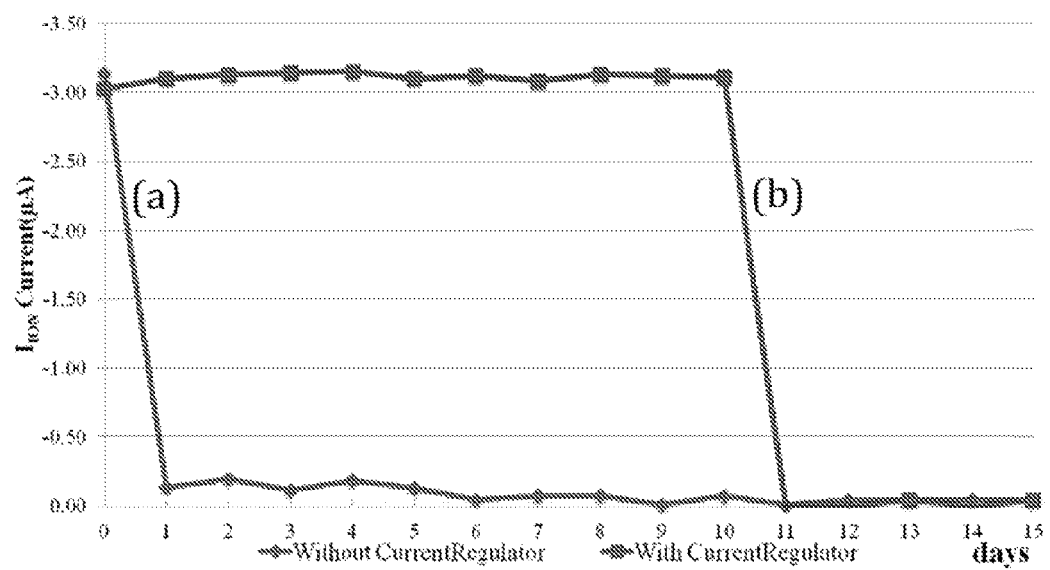
FIG. 23 is a graph which illustrates ion current as a function of time for the negative mode point-to-plane corona without (a) and with (b) the current regulator.

For the stability test with the current regulator, the unit was left running continuously for 15 days. Stability test results of the ion current with point-to-plane corona load in negative-mode are illustrated in FIG. 23. The corona source without the current regulator collapsed after 1 day and never returned to its initial value of 3 μA. By contrast, for the point-to-plane corona with the current regulator, it was not until the 11$^{th}$ day until the corona ion source turned off.

The currents in the negative-mode experiment were less stable than in the positive-mode. It was also noticed that the ion current in the negative-mode was two orders of magnitude higher than the positive-mode under the same voltage conditions. This large variation in the corona characteristics in the negative-mode caused the current regulator to regulate for only 11 days, compared to 23 days of regulation in positive-mode.

Example 2. IMS Laboratory Experiment Setup

Figure 24:
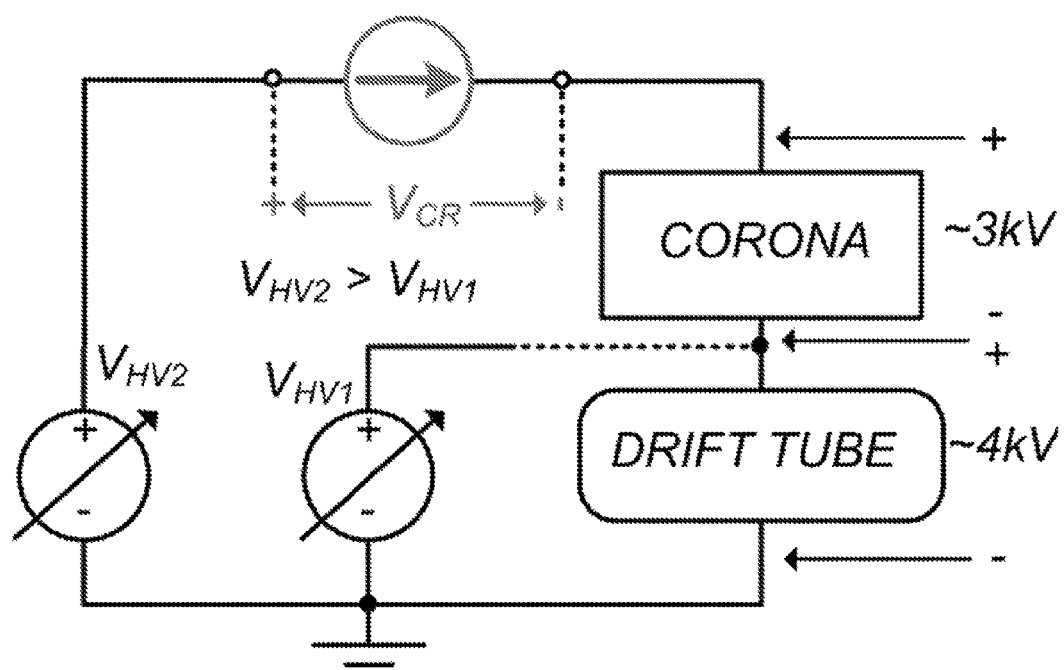
FIG. 24 is a schematic drawing which illustrates a positive-mode ion-mobility spectrometry ("IMS") laboratory experiment.
Figure 25:
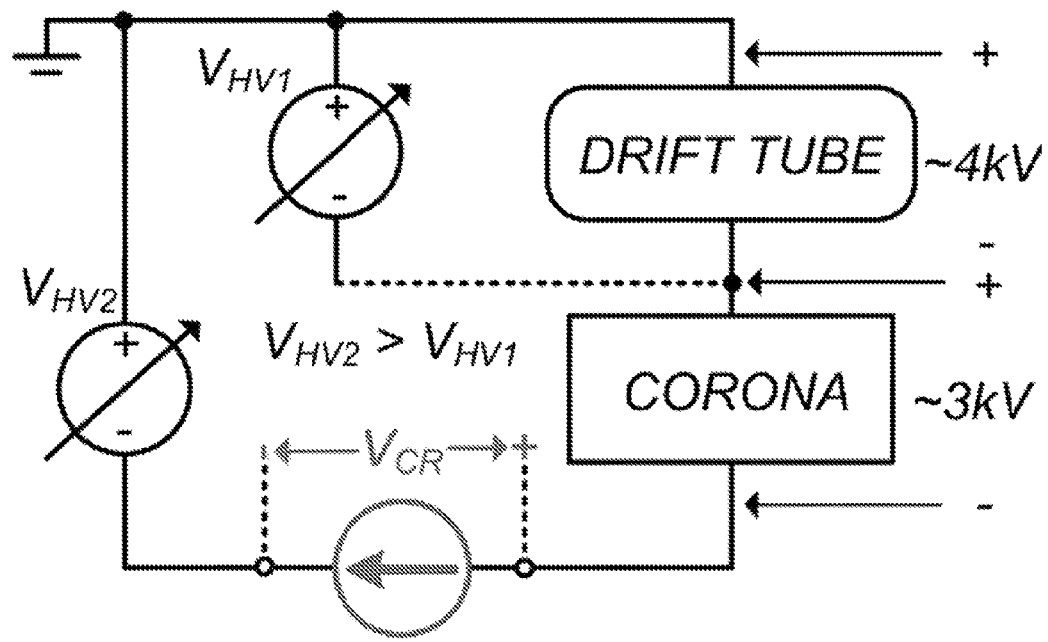
FIG. 25 is a schematic drawing which illustrates a negative mode IMS laboratory experiment.

1) Experimental setups for positive-mode and negative-mode IMS experiments are illustrated in FIGS. 24 and 25, respectively. The current regulator was connected in series with the corona load and the drift-tube.

Under constant voltage conditions, corona ion current changes quickly over time. Variations in ion current through the corona cause variations in mobility peak heights and areas, reducing the sensitivity of an IMS instrument. When a programmable high-voltage micro-ampere current regulator according to an embodiment of the present invention is placed in series with the corona ion source, the current regulator increases the sensitivity of an IMS instrument. The experimentally verified solution has a DC-DC isolation of up to ±10 kV with 1.4 kV current regulator voltage compliance. The current regulator, according to an embodiment of the present invention, is programmable from about 0.5 μA to about 50 μA and has a very fast time constant of about 20 μs when driving an assumed corona resistance of 10 MΩ. The circuitry of an embodiment of the present invention can be create using simple, off the shelf electronic components, making it readily available to integrate into existing IMS instruments.

Table I compares an embodiment of the present invention with the existing secondary-electrode current regulators. The current regulator can use a higher initial supply voltage, which increases power consumption at the beginning of an experiment or other application. In the voltage-mode configuration, a fraction of the ion current can be sampled in order to measure and regulate the ion current. The current regulator of an embodiment of the present invention measures the ion current directly, whereas the conventional regulators measure a sample that is assumed to be proportional to the actual ion current.

TABLE I

COMPARISION OF ION CURRENT REGULATONSCHEMES

| | Conventional | Current Invention |
|---|---|---|
| Voltage Loss | N/A | N/A |
| Current Loss | ~ 10% | N/A |
| Ground Referenced | Yes | Yes |
| Feedback Loop Bandwidth | Moderate | Fast |
| Feedback Loop Complexity | Moderate | Low |
| Cost of Implementation | Moderate | Low |

With the introduction of two opto-isolators, ground-referenced current monitoring is possible with both regulation configurations.

Some of the major advantages of the current regulators of the present invention include low-cost of implementation and high-speed feedback. The regulator can use an adaptive high-voltage DC supply to maintain constant current when the corona resistance increases over long-term. Such benefits are significant—partly because conventional regulators require a continuously-variable voltage supply by sensing the ion current through a mechanical secondary electrode. That voltage-mode feedback loop is comparatively slow and complex, so that it avoids the possibility of unstable circuit operation.

The preceding examples can be repeated with similar success by substituting the generically or specifically described components and/or operating conditions of embodiments of the present invention for those used in the preceding examples.

Optionally, embodiments of the present invention can include a general or specific purpose computer or distributed system programmed with computer software implementing steps described above, which computer software may be in any appropriate computer language, including but not limited to C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A high voltage current regulator comprising:
    a DC-DC isolation converter configured to provide a first floating DC voltage source comprising high voltage isolation with positive and negative terminals;
    a first amplifier comprising a positive supply terminal coupled to said positive terminal of said first floating DC voltage source;
    a first reference voltage coupled to a first input terminal of said first amplifier;
    a first high voltage supply comprising positive and negative terminals;
    the DC-DC isolation converter configured to provide high voltage isolation between said floating DC voltage source and a ground;
    a metal-oxide-semiconductor transistor comprising a gate, said gate coupled to the output of said first amplifier;
    a first precision resistor, a source of said transistor, and a drain of said transistor, connected in a series circuit and coupled in series with a grounded load between said positive and negative terminals of said first high voltage supply;
    said high voltage current regulator configured such that current produced by said first high voltage supply is deliverable to the grounded load; and
    a terminal of said first precision resistor coupled to a second input terminal of said first amplifier.

2. The high voltage current regulator of claim 1 wherein said high voltage current regulator is configured to provide a positive voltage to the grounded load with respect to the ground.

3. The high voltage current regulator of claim 1 wherein said first amplifier comprises an operational amplifier.

4. The high voltage current regulator of claim 3 wherein said operational amplifier comprises a CMOS rail-to-rail operational amplifier.

5. The high voltage current regulator of claim 1 wherein said metal-oxide-semiconductor transistor comprises an n-channel metal-oxide-semiconductor transistor.

6. The high voltage current regulator of claim 1 wherein said metal-oxide-semiconductor transistor comprises a p-channel metal-oxide-semiconductor transistor.

7. The high voltage current regulator of claim 1 wherein said first reference voltage comprises an element selected from the list consisting of: the output of a reference circuit powered by said floating DC voltage source, a divided voltage of said floating DC voltage source, and a combination of a reference circuit and a divided voltage.

8. The high voltage current regulator of claim 1 wherein said high voltage current regulator is configured to provide a regulated current to the grounded load from said negative terminal of said high voltage supply.

9. The high voltage current regulator of claim 1 further comprising:
    a second floating DC voltage source comprising high voltage isolation with positive and negative terminals;
    a second amplifier comprising a positive supply terminal coupled to said positive terminal of said second floating DC voltage source;
    said second amplifier further comprising a negative supply terminal coupled to said negative terminal of said second floating DC voltage source;
    a second reference voltage coupled to a first input terminal of said second amplifier;
    a second high voltage supply comprising positive and negative terminals;
    a voltage divider circuit connected such that during operation current from said second high voltage supply will flow through said voltage divider circuit; and
    a center tap of said voltage divider circuit connected to a second input of said second amplifier.

10. The high voltage current regulator of claim 9 wherein said first and said second high voltage supplies are a single high voltage supply.

11. The high voltage current regulator of claim 9 wherein said first and said second floating DC voltage sources are a single floating DC voltage source.

12. The high voltage current regulator of claim 9 wherein said voltage divider circuit is arranged in parallel with said series circuit of said first precision resistor, said source of said transistor, and said drain of said transistor.

13. A high voltage current regulator comprising:
    a DC-DC isolation converter configured to provide a floating DC voltage source comprising positive and negative terminals;
    an amplifier comprising a positive supply terminal coupled to said positive terminal of said floating DC voltage source;
    a reference voltage coupled to a first input terminal of said amplifier;
    a high voltage supply comprising positive and negative terminals;
    the DC-DC isolation converter configured to provide high voltage isolation between said floating DC voltage source and a ground;
    a voltage divider circuit connected in series with a grounded load such that during operation current from said high voltage supply flows through said voltage divider circuit;
    said high voltage current regulator configured such that current produced by said high voltage supply is deliverable to the grounded load;
    a center tap of said voltage divider circuit connected to a second input of said amplifier; and
    said amplifier further comprising an output terminal coupled to a control input of said high voltage supply.

14. The high voltage current regulator of claim 13 wherein said amplifier comprises an operational amplifier.

15. The high voltage current regulator of claim 14 wherein said amplifier comprises a CMOS rail-to-rail operational amplifier.

16. A method for regulating the current provided to a grounded load from a high voltage source comprising:
    providing, via a DC-DC isolation converter, a floating DC power supply to power an amplifier such that the DC-DC isolation converter is configured to provide high voltage isolation between the floating DC power supply and a ground;

providing a reference voltage to a first input of the amplifier;

coupling a first terminal of a precision resistor to a second input of the amplifier;

providing a gate terminal of a metal-oxide semiconductor transistor to an output terminal of the amplifier;

delivering current to the load produced by the high voltage source to the grounded load; and programming the regulated current delivered to the load with the reference voltage.

17. The method for regulating the current provided to a grounded load from a high voltage source of claim 16 further comprising dividing a voltage from the high voltage source and providing it to an input terminal of a second amplifier.

* * * * *